United States Patent
Kim

(10) Patent No.: US 10,926,898 B2
(45) Date of Patent: Feb. 23, 2021

(54) MEDICINE PACKING APPARATUS

(71) Applicant: JVM Co., Ltd., Daegu (KR)

(72) Inventor: Jun-Ho Kim, Daegu (KR)

(73) Assignee: JVM CO., LTD, Daegu (KR)

( * ) Notice: Subject to any disclaimer, the term of this patent is extended or adjusted under 35 U.S.C. 154(b) by 393 days.

(21) Appl. No.: 15/591,220

(22) Filed: May 10, 2017

(65) Prior Publication Data

US 2017/0355476 A1 Dec. 14, 2017

(30) Foreign Application Priority Data

Jun. 14, 2016 (KR) .................... 10-2016-0073565
Jul. 7, 2016 (KR) .................... 10-2016-0086033

(Continued)

(51) Int. Cl.
*B65B 5/10* (2006.01)
*B65B 1/04* (2006.01)
(Continued)

(52) U.S. Cl.
CPC ............ *B65B 5/103* (2013.01); *A61J 7/0084* (2013.01); *B65B 1/04* (2013.01); *B65B 35/26* (2013.01);
(Continued)

(58) Field of Classification Search
CPC .......... A61J 7/0084; B65B 1/04; B65B 5/103; B65B 35/26; B65B 51/10; B65B 51/16;
(Continued)

(56) References Cited

U.S. PATENT DOCUMENTS 5,720,154 A * 2/1998 Lasher ............... G07F 17/0092
53/411
5,875,610 A * 3/1999 Yuyama ............. B29C 66/1122
53/75
(Continued)

FOREIGN PATENT DOCUMENTS

EP 2213274 A1 8/2010
JP 3009843 B2 2/2000
(Continued)

OTHER PUBLICATIONS

European Search Report dated Oct. 20, 2017 for European application No. 17170476.0.

*Primary Examiner* — Hemant Desai
*Assistant Examiner* — Jacob A Smith
(74) *Attorney, Agent, or Firm* — Ohlandt, Greeley, Ruggiero & Perle, L.L.P.

(57) ABSTRACT

A medicine packing apparatus is provided. The medicine packing apparatus includes: a rotation hopper provided with a plurality of partition spaces, transferring a medicine from a medicine dispenser to any one of the plurality of partition spaces through at least one injection part, and transferring the medicine to the discharge part; an inspector photographing the transferred medicine to inspect the medicine; a controller determining whether the medicine inspected by the inspector matches a medicine of a prescription; and a re-injection part disposed in a partition space between an injection part having a shortest medicine transfer distance to the discharge part on the basis of a rotation direction of the rotation hopper and the discharge part.

8 Claims, 31 Drawing Sheets

(30) Foreign Application Priority Data

Aug. 5, 2016 (KR) .................. 10-2016-0100035
Nov. 28, 2016 (KR) .................. 10-2016-0158954
Apr. 20, 2017 (KR) .................. 10-2017-0051118

(51) Int. Cl.
| | | |
|---|---|---|
| B65B 35/26 | (2006.01) | |
| B65B 51/10 | (2006.01) | |
| B65B 57/12 | (2006.01) | |
| B65B 57/14 | (2006.01) | |
| B65B 61/26 | (2006.01) | |
| B65B 51/16 | (2006.01) | |
| A61J 7/00 | (2006.01) | |
| B65B 35/40 | (2006.01) | |
| B65G 19/08 | (2006.01) | |

(52) U.S. Cl.
CPC ............ *B65B 35/405* (2013.01); *B65B 51/10* (2013.01); *B65B 51/16* (2013.01); *B65B 57/12* (2013.01); *B65B 57/14* (2013.01); *B65B 61/26* (2013.01); *B65G 19/08* (2013.01); *B65G 2201/027* (2013.01)

(58) Field of Classification Search
CPC ....... B65B 57/14; B65B 57/12; B65B 61/025; B65B 61/26
USPC .... 53/52, 54, 55, 131.4, 154, 168, 237, 247, 53/374.4, 493, 562
See application file for complete search history.

(56) References Cited

U.S. PATENT DOCUMENTS

| | | | | |
|---|---|---|---|---|
| 6,349,526 | B1* | 2/2002 | Newman | B07C 5/10 53/143 |
| 6,481,180 | B1* | 11/2002 | Takahashi | B65B 5/103 221/133 |
| 6,690,998 | B1* | 2/2004 | Yuyama | B65B 5/103 193/14 |
| 6,792,736 | B1* | 9/2004 | Takahashi | B65B 37/08 53/237 |
| 6,805,259 | B2* | 10/2004 | Stevens | B65B 5/103 198/757 |
| 6,877,611 | B2* | 4/2005 | Yamamoto | A61J 3/074 209/646 |
| 7,669,733 | B2* | 3/2010 | Kim | G07F 11/54 221/265 |
| 7,770,355 | B2* | 8/2010 | Inamura | B65B 9/06 53/131.5 |
| 7,894,656 | B2* | 2/2011 | Kim | G07F 17/0092 382/141 |
| 7,995,831 | B2* | 8/2011 | Eller | G07F 9/026 382/142 |
| 8,584,434 | B2* | 11/2013 | Kodama | B65B 5/103 53/246 |
| 8,650,844 | B2* | 2/2014 | Romanyszyn | B65B 1/04 53/512 |
| 8,887,479 | B2* | 11/2014 | Koike | B65B 9/087 53/479 |
| 9,272,796 | B1* | 3/2016 | Chudy | G07F 17/0092 |
| 2004/0112909 | A1* | 6/2004 | Yamamoto | B65B 5/103 221/7 |
| 2008/0149522 | A1* | 6/2008 | Kim | G07F 17/0092 206/534 |
| 2009/0071971 | A1* | 3/2009 | Johnston | A61J 7/0481 221/1 |
| 2011/0061345 | A1* | 3/2011 | Cherukuri | A61P 29/00 53/473 |
| 2012/0324828 | A1* | 12/2012 | Yasunaga | B65B 39/002 53/111 R |
| 2012/0324829 | A1* | 12/2012 | Omura | B65B 1/28 53/147 |
| 2013/0081362 | A1* | 4/2013 | Yuyama | B65B 51/28 53/452 |
| 2013/0174520 | A1* | 7/2013 | Tessier | B65B 3/003 53/452 |
| 2014/0123601 | A1* | 5/2014 | Murokh | B41J 2/442 53/411 |
| 2014/0318078 | A1* | 10/2014 | Kondo | B65B 5/103 53/54 |
| 2014/0318087 | A1 | 10/2014 | Kondo et al. | |
| 2015/0047295 | A1* | 2/2015 | van de Loecht | B65B 5/08 53/235 |
| 2015/0266604 | A1* | 9/2015 | Amano | B65H 23/182 53/65 |
| 2015/0274339 | A1* | 10/2015 | An | B65B 35/30 53/493 |

FOREIGN PATENT DOCUMENTS

| | | |
|---|---|---|
| JP | 4093437 B2 | 6/2008 |
| KR | 100457269 B1 | 1/2005 |
| KR | 100787806 B1 | 12/2007 |

* cited by examiner

MEDICINE PACKING APPARATUS

CROSS-REFERENCE TO RELATED APPLICATIONS

This application claims priority from Korean Patent Application No. 10-2016-0073565, filed on Jun. 14, 2016, Korean Patent Application No. 10-2016-0086033, filed on Jul. 7, 2016, Korean Patent Application No. 10-2016-0100035, filed on Aug. 5, 2016, Korean Patent Application No. 10-2016-0158954, filed on Nov. 28, 2016 and Korean Patent Application No. 10-2017-0051118, filed on Apr. 20, 2017, in the Korean Intellectual Property Office, the disclosure of which is incorporated herein by reference in its entirety.

BACKGROUND OF THE INVENTION

Field of the Invention

Apparatuses and methods consistent with the present disclosure relate to a medicine packing apparatus, and more particularly, to a medicine packing apparatus having a rotation hopper for automatically rotating a medicine.

Description of the Related Art

In general, the automatic medicine packing machine is housed in a medicine dispenser for receiving and dispensing typical tablets, atypical tablets like a half tablet, and a powdered medicine in a powder form, respectively, to automatically package the medicines in a single dosage simultaneously or independently, depending on a prescription for a patient.

Here, the medicine dispenser may include a cassette for dispensing typical medicines, a tablet tray for dispensing atypical medicines, or a powder tray for dispensing powdered medicines.

At this time, the medicines received in the cassette are stored in a large amount in the medicine dispenser and may be automatically dispensed as needed, but medicines which may not be received in the cassette may be automatically dispensed by separately preparing the tray for dispensing medicines as needed and then installing the tray in the automatic medicine packing apparatus.

Meanwhile, the existing medicine dispenser has the main body provided with the cassettes and the trays containing the medicines, and if a user inputs a kind and an amount of medicines through an input machine depending on the prescription, the cassette and the tray discharges the medicines corresponding to the single dosage.

The discharged medicines may drop into the hopper and collected therein, the collected medicines are packaged in packing paper by a single dosage, and an operation of discharging the medicines from the cassette and the tray and packaging the discharged medicines is repeated depending on the number of dosages input to the input device, such that the packaging of the medicines is continuously performed.

Since the automatic medicine packing machine is a product in which the reliability of operations such as accurately packaging and discharging the medicines depending on the input of type and amount of the medicines to be taken once is very important, and therefore a meticulous inspection process on whether the medicines packaged in the packing paper by a single dosage is damaged, whether foreign matters are attached thereto, and the number of medicines depending on the prescription, or the like are required.

For this reason, conventionally, as an apparatus for inspecting whether the packaged medicines are normal or not, a camera for photographing a medicine bag printed with information about medicines and a vision inspection system determining whether the medicines are normally packaged by the images photographed by the camera are mainly used.

However, the existing medicine packing apparatus has a problem in that the inspection system is used in the state in which the medicines are packaged and thus the medicine bag and the medicines are consumed and the medicines are packaged even when the medicines are not normally delivered and thus the time required for the packaging is increased.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present disclosure provides a medicine dispenser having a medicine rotation unit capable of realizing accuracy, promptness and convenience of package and inspection of a medicine before packaging the medicine by a single dosage depending on a prescription.

According to an aspect of the present disclosure, a medicine packing apparatus includes: a rotation hopper provided with a plurality of partition spaces, receiving a medicine from a medicine dispenser at any one of the plurality of partition spaces through at least one injection part, and transferring the medicine to the discharge part; an inspector photographing the transferred medicine to inspect the medicine; a controller determining whether the medicine inspected by the inspector matches a medicine of a prescription; and a re-injection part disposed in a partition space between an injection part having a shortest medicine transfer distance to the discharge part on the basis of a rotation direction of the rotation hopper and the discharge part.

The inspector may be disposed in a partition space corresponding to the injection part having the shortest medicine transfer distance to the discharge part on the basis of the rotation direction of the rotation hopper.

When the inspected medicine mismatches the medicine of the prescription, the re-injection part may re-inject a medicine so that the inspected medicine matches the medicine of the prescription.

The re-injection part may receive a medicine through an external inlet disposed at an outside of the medicine packing apparatus.

The rotation hopper may include a bottom portion on which the medicine collected from the medicine dispenser is placed and a medicine transfer part pushing the medicine placed at any one location of the bottom portion to another location of the bottom portion to transfer the medicine.

The medicine transfer part may include a rotation member performing the transfer and a partition member having one end fixed to the rotation member.

The plurality of partition spaces may be formed by the partition member.

The medicine packing apparatus may further include: an illuminator disposed at a lower portion of the partition space in which the inspector is disposed, in which the bottom portion corresponding to the partition space in which the illuminator is disposed may be formed of a light transmitting material.

The rotation hopper may include a vibrator vibrating the transferred medicine.

The vibrator may be disposed in the partition space in which the inspector is disposed.

The controller may acquire area information from the photographed medicine image and select a predetermined width of a medicine sheet corresponding to the acquired area information from predetermined widths of the medicine sheet.

The medicine packing apparatus may further include: a sealer sealing the medicine sheet at the selected width.

The sealer may include: a pair of longitudinal sealing rollers disposed at a lower portion of the discharge part and performing sealing in a longitudinal direction of the medicine sheet folded in half; and a pair of lateral sealing rollers performing sealing in a lateral direction of the medicine sheet, in which the controller may determine stopping and driving of the pair of lateral sealing rollers based on the predetermined width of the medicine sheet.

The medicine packing apparatus may further include: a printer printing medicine information in a predetermined region of the medicine sheet based on the selected width before the medicine is transferred to the medicine sheet, in which the printer may print the medicine information on the medicine sheet while the medicine sheet is transferred to the sealer by the longitudinal sealing roller.

The medicine packing apparatus may further include: a marking apparatus using an erasable marker to perform marking on a medicine sheet in which a medicine included in a cell supplied with the medicine is sealed when a quantity extracted from the photographed medicine image is different from that of the prescription.

The rotation hopper may include a disposal part for discarding the medicine when the medicine mismatches a medicine list of the prescription as an inspection result of the inspector.

According to another aspect of the present disclosure, a medicine packing method includes: supplying a medicine from a medicine dispenser to any one of a plurality of cells formed in a rotation hopper through a first injection part and supplying a medicine through a special injection part that feeds an atypical tablet or a special handling medicine separately; photographing and inspecting the supplied medicine; selecting a predetermined width of a medicine sheet based on the photographed medicine image; transferring the medicine to the medicine sheet; and sealing the medicine sheet at the selected width.

The medicine packing method may further include: supplying an omitted medicine through a re-injection part when a quantity extracted from the photographed medicine image is smaller than that of a prescription.

The medicine packing method may further include: when a quantity extracted from the photographed medicine image is different from that of a medicine list of the prescription, discarding the medicine.

The medicine packing method may further include: performing, by an erasable marker, marking on a medicine sheet in which a medicine included in the cell supplied with the medicine is sealed when a quantity extracted from the photographed medicine image is smaller than that of a prescription.

According to the medicine dispenser according to the exemplary embodiment of the present disclosure, first, the inspector may photograph the partition space in which the inspector is disposed, and the controller may analyze the photographed image to determine whether the medicines match the prescription to separately perform the photographing and the determination, thereby realizing the continuous transfer of the partition space without regard to time taken to determine.

Second, if it is determined that the inspected medicines mismatch the prescription, the medicine may be re-injected through the re-injection part to match the prescription, thereby increasing the accuracy of the packaged medicine.

Third, the location of the re-injection part may be disposed in the medicine injection part, thereby quickly re-injecting the omitted medicine.

Fourth, the re-injection part may be located above the plane on which the partition spaces are disposed, such that the re-injected medicine may drop and injected. Therefore, it is possible to transfer and inject the re-injected medicine with a simple structure.

Fifth, the display may display the details on whether the inspected medicine matches the medicine for the prescription, such that the examiner may appropriately perform the operation of the medicine dispenser corresponding to the displayed details.

Sixth, the aligner aligning the injected medicines spaces the injected medicines apart from the interface between the partition spaces at a predetermined interval, thereby increasing the accuracy of the medicine inspection by the inspector.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
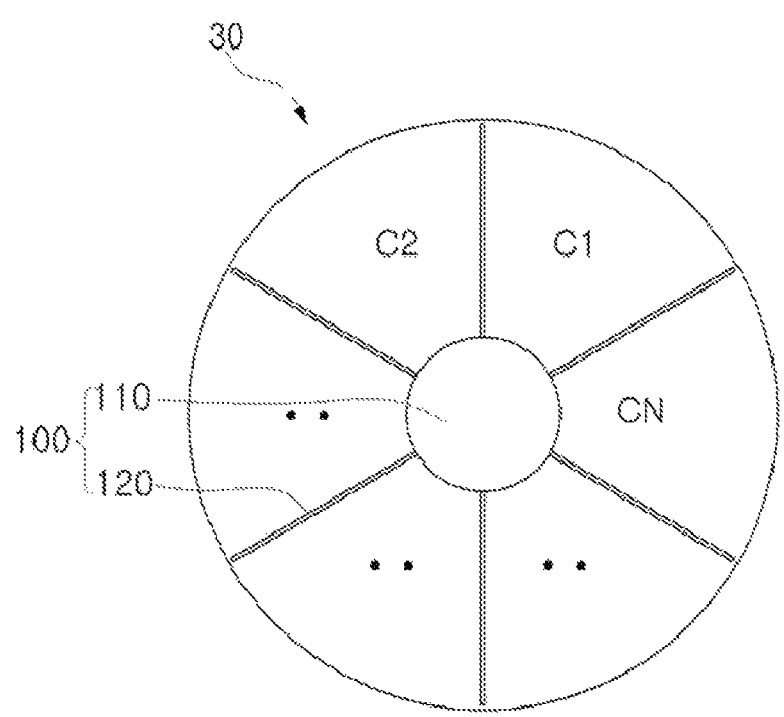
FIG. 1 is a conceptual view of a rotation hopper according to an exemplary embodiment of the present disclosure.

Hereinafter, exemplary embodiments of the present disclosure will be described in detail with reference to the accompanying drawings. At this time, it is to be noted that like reference numerals denote like elements in the accompanying drawings. Moreover, detailed descriptions related to well-known functions or configurations will be ruled out in order not to unnecessarily obscure the subject matter of the present disclosure. For the same reason, some components are exaggerated, omitted, or schematically illustrated in the accompanying drawings.

Figure 2:
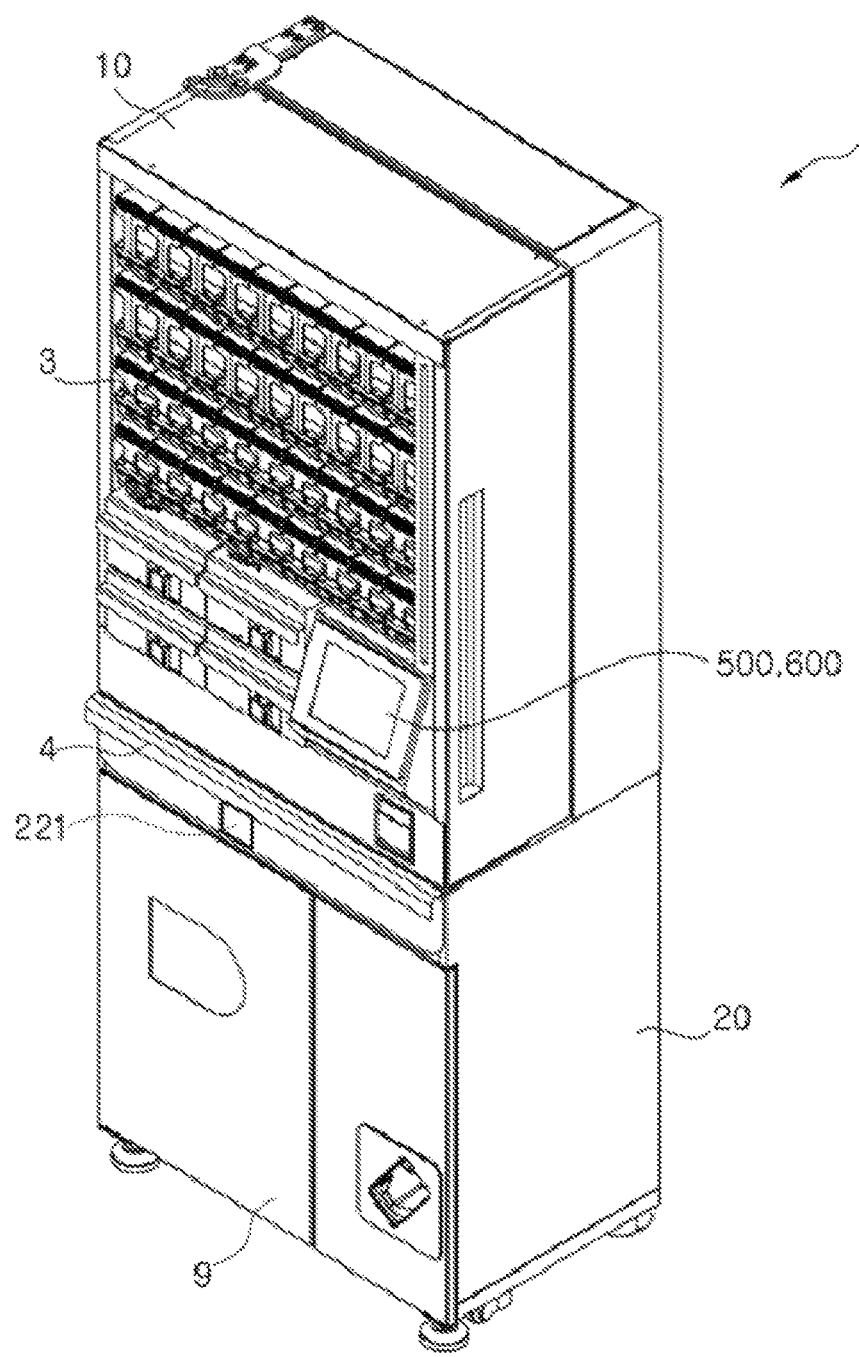
FIG. 2 is a perspective view of a medicine packing apparatus according to an exemplary embodiment of the present disclosure.
Figure 3:
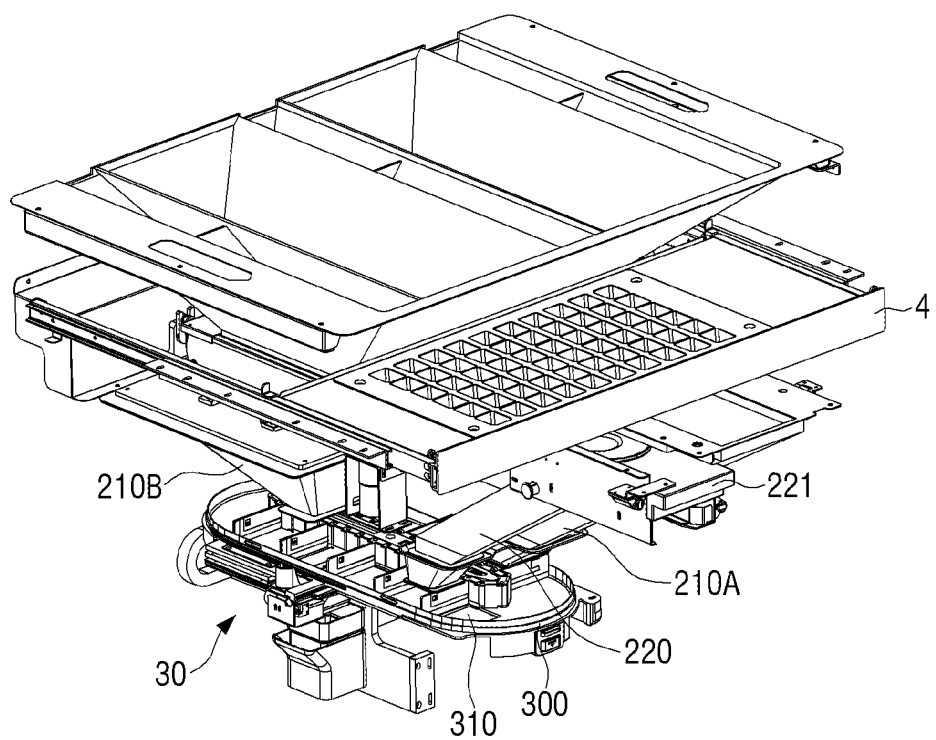
FIG. 3 is a perspective view illustrating a part of a medicine packing apparatus including the rotation hopper according to the exemplary embodiment of the present disclosure and an injection part disposed on an upper portion of the rotation hopper.

FIG. 1 is a conceptual view of a rotation hopper according to an exemplary embodiment of the present disclosure, FIG. 2 is a block diagram of a medicine packing apparatus according to an exemplary embodiment of the present disclosure, and FIG. 3 is a perspective view illustrating a part of a medicine packing apparatus including the rotation hopper according to the exemplary embodiment of the present disclosure and an injection part disposed on an upper portion of the rotation hopper.

Referring to FIG. 2, a rotation hopper 30 is an apparatus that is provided in a lower body 20 of the medicine packing apparatus 1 and receives a medicine from a medicine dispenser 10 and inspects whether the provided medicine matches a prescription and dispenses the medicine to a medicine sheet by one pack.

The medicine dispenser 10 includes at least one of a tablet receiving part, an atypical tablet receiving part, a powder receiving part, and a special handling medicine receiving part.

The tablet receiving part receives typical tablets. The tablet receiving part may include a plurality of cassettes 3 for storing tablets for each type.

The atypical tablet receiving part receives atypical tablets. Here, the atypical tablet receiving part is a receiving part that receives the atypical tablet whose form is irregular like a half-piece tablet. The atypical tablet receiving part may be configured to include a plurality of automatic atypical tablet feed cassettes for storing the atypical tablets for each type.

The powder receiving part stores medicines in a powder form.

The special handling medicine receiving part is a receiving part for receiving a typical or atypical tablet and is a receiving part for receiving a medicine that may not be received in the tablet receiving part or the atypical tablet receiving part for the reasons of the handling and management of medicines. The special handling medicine receiving part may be configured to include the tray 4.

The rotation hopper 30 performs an injection of medicines, an inspection of medicines, a re-injection of medicines, and a discharge of medicines. To perform the above operations, the rotation hopper 30 may include at least two partition spaces, an injection part, an inspector, a controller, a re-injection part, a display, and an input.

At this time, the injection part, the inspector, and the discharge part may all be disposed in any one of the plurality of partition spaces transferred by the rotation member, and at least one of the injection part, the inspector, and the discharge part may be disposed in a partition space other than the partition space in which the others are disposed.

For example, the injection part and the inspector may be disposed in the same partition space, and the discharge part may be disposed in the other partition space.

The injection part injects one or more medicines into at least one of the partition spaces. The injection part may be a hopper or a medicine moving passage for guiding the medicine discharged from at least one of the tablet receiving part, the atypical tablet receiving part, the powder receiving part, and the special handling medicine receiving part to at least one of the partition spaces.

According to the exemplary embodiment, the injection part may include a first injection part and a second injection part.

At this time, a first injection part 210A may be configured to inject the medicine collected from at least one of the tablet receiving part, the atypical tablet receiving part, the powder receiving part, and the special handling medicine receiving part into at least one of the partition spaces and the second injection part 210B may be configured to inject the medicine collected from at least one of the remaining receiving parts except for the receiving part for providing the medicine to the first injection part into at least one of the partition spaces.

Referring to FIG. 3, the first injection part 210A and the second injection part 210B are each disposed in different partition spaces. However, the disposition of the first and second injection parts 210A and 210B is not limited thereto, and the first injection part 210A and the second injection part 210B may each be disposed in different partition spaces or may also be disposed in the same partition space. If the first injection part 210A and the second injection part 210B are disposed in the same partition space, a medicine corresponding to one pack may be simultaneously injected into the partition space in which the first injection part 210A and the second injection part 210B are disposed.

The inspector 400 (see FIG. 9) is an apparatus for inspecting medicines injected through the injection parts 210A and 210B, and inspects the injected medicine by photographing the partition space in which the inspector 400 is disposed.

The controller (not shown) determines whether the medicines inspected by the inspector 400 match the medicines described in the prescription. The controller determines that the medicines do not match the prescription when there is at least one of the entire omission of the medicine, the partial omission of the medicine, the over-injection of the medicine, and the mis-injection of the medicine, the damage of the medicine as the inspection result.

The re-injection part 220 re-injects medicines so that the medicines match the prescription if the controller determines that the inspected medicines do not match the medicines of the prescription. For this, the re-injection part 220 is disposed in the partition space in which the inspector 400 is disposed, and therefore if the medicines do not match the medicine list as the inspection result, the medicine may be re-injected through the re-injection part 220. Further, the re-injection part 220 may be disposed in a path through which the partition space in which the inspection part 400 is disposed moves to a discharge part 310. That is, to match the prescription, the re-injection part 220 is disposed in any one of the partition spaces including the inspected medicines to re-inject medicines into the partition space in which the medicines not matching the medicines of the prescription medicines are received.

The re-injection part 220 may be supplied with the medicine to be re-injected from the re-injected medicine storing box designated in the medicine dispenser 10. The re-injection part 220 may have a hopper shape in which the medicine provided from the re-injected medicine storing box is guided to at least one of the partition spaces.

At this time, the re-injected medicine storing box may be any one designated cassette of the cassettes provided in the tablet receiving part, any one designated cassette of cassettes for the automatic atypical tablet feed cassettes provided in the atypical tablet receiving part, or any one of the trays provided in the special handling medicine receiving part.

According to the exemplary embodiment, the re-injection part 220 may also be supplied with the medicine manually re-injected through an external inlet 221. In this case, the re-injection part may be configured to include a medicine moving passage for guiding the medicine injected from the external inlet 221 to at least one of the partition spaces.

Referring to FIG. 3, when the medicine to be re-injected through the external inlet 221 is supplied, the re-injected medicine is transferred to the re-injection part 220. At this time, the external inlet 221 may be controlled to be automatically open when the inspected medicine is different from the medicine of the prescription.

The discharge part 310 and a disposal part 320 discharge the medicine injected into the partition space. The discharge part 310 transfers the injected medicine toward the packing apparatus, and the disposal part 320 transfers the injected medicine toward a medicine disposal container.

According to the exemplary embodiment, the discharge part 310 and the disposal part 320 may be disposed in the same partition space or in different partition spaces.

The discharge part 310 discharges the medicine, which matches the prescription of the inspection result, to the packing apparatus.

Hereinafter, a general embodiment in which the medicine injecting operation, the medicine inspecting operation, the medicine re-injecting operation, and the medicine discharging operation performed in a rotation hopper 30 according to the present disclosure are performed will be described with reference to FIG. 1.

The rotation hopper 30 includes a plurality of partition spaces C1, C2, . . . , Cn partitioned by the partition member 120. The rotation hopper 30 includes a rotation member 110 which is transferred by a driver and a partition member 120 which is connected to the rotation member 110 to form the partition spaces C1, C2, . . . , Cn.

Although six partition spaces C1, C2, . . . , Cn are shown in the drawings, this is for convenience of illustration, and therefore the present disclosure is not limited thereto. Even when the medicine dispenser of the present disclosure is implemented in two partition spaces, it is possible to perform the medicine injecting operation, the medicine inspecting operation, the medicine re-injecting operation, and the medicine discharging operation. The number of the partition spaces used may be appropriately changed depending on the disposition locations of the injection part, the re-injection part, the inspector, and the discharge part.

The medicine dispenser includes N partition spaces (where N is a natural number equal to or greater than 2), in which the injection parts 210A and 210B, the inspector 400, and the discharge part 310 may all be disposed in any one of the partition spaces together and at least one of the injection parts 210A and 210B, the inspector 400 and the discharge part 310 may be disposed in a partition space other than the partition space in which the remaining other components are disposed.

For example, the injection parts 210A and 210B and the inspector 400 may be disposed in the same partition space, and the discharge part 310 may be disposed in the other partition space.

At this time, when the injection part is disposed in a partition space C1, the re-injection part 220 may be disposed in the same partition space C1 and may also be disposed in any one of the remaining partition spaces C2, . . . , CN other than the partition space C1. The re-injection part 220 may be located on an upper side with respect to a plane on which the N partition spaces are to be transferred.

Referring to FIG. 3, the re-injection part 220 is disposed above the location where the partition space is formed by the rotation hopper 30. In this way, the medicine drops by gravity and injected. Therefore, the re-injection part 220 may be formed with the simple structure.

The inspector 400 may be disposed in a partition space in which the injection parts 210A and 210B are disposed, or in any one of the partition spaces in a direction in which the partition space is transferred. That is, the inspector 400 may be disposed in the partition space in which the medicines of the medicine list described in the prescription all are collected or in any one of the remaining partition spaces in the direction that moves the partition space in which all the medicines of the medicine list described in the prescription are collected.

It is assumed that the rotation hopper 30 rotates counterclockwise and the medicine is discharged to the discharge part 310 through the partition space in which the first injection part 210A and the second injection part 210B are disposed. At this time, the inspector 400 may be disposed in the partition space corresponding to the second injection part 210B which is the injection part having the shortest medicine transfer distance to the discharge part 310. Since the partition space in which the second injection part 210B is disposed corresponds to the partition space in which the medicine is ultimately collected, it may be determined whether the medicines of the prescription match the medicines stored in the partition space in which the second injection part 210B is disposed.

For example, if the medicine described in the prescription is composed of an A medicine, a B medicine, and a C medicine and the injection part includes an A medicine injection part for injecting the A medicine, a B injection part for injecting the B medicine, and a C injection part for injecting the C medicine that are separately disposed in three partition spaces, the inspector may be disposed in the partition space in which the last C medicine injection part is disposed or any one of the partition spaces after the partition space in which the last C medicine injection part is disposed.

The re-injection part 310 is a re-injection part for re-injecting the omitted medicines so as to match the prescription, and therefore the re-injection part 310 is preferably disposed in the partition space in which the inspector 400 is disposed or any one of the partition spaces after the partition space in which the inspector 400 is disposed.

When the medicines of the medicine list described in the prescription are fully injected through one injection part, the injection parts 210A and 210B, the inspection part 400, and the re-injection part 220 may all be disposed in one partition space.

That is, even when all the injection parts 210A and 210B, the inspector 400, and the re-injection part 220 are disposed in the partition space C1, the discharge part is disposed in the partition space C2, and the rotation hopper 30 includes two partition spaces, it is possible to perform a normal operation of the medicine inspection and the dispensing operation.

In this way, if the rotation hopper 30 has only two partition spaces, the operation processes of the injection parts 210A and 210B, the inspector 400, the re-injection part 220, and the discharge part 310 will be described.

First, the medicine (that is, medicines of the medicine list described in the prescription) corresponding to one pack is fully injected into the partition space C1 through the injection part. The injected medicines may be different depending on the prescription, and therefore the medicine corresponding to one pack may be composed of only medicines received in the cassette, only medicines received in the tray, or both of the medicines received in the cassette and the tray. At this time, the injection parts 210A and 210B may be a hopper by which the medicine dropping from the cassette and the medicine dropping from the tray are transferred to one partition space.

When the medicine corresponding to one pack is fully injected into the partition space C1, the inspector 400 photographs the partition space C1. The controller analyzes the image photographed by the inspector 400, to recognize the injected medicine, and determines whether or not the recognized medicine matches the medicine list described in the prescription.

At this time, when the injected medicines are adjacent to or close to the interface of the partition space C1, the medicine may be occluded at the interface. Therefore, it is necessary to separate the injected medicine from the interface. In addition, the dropping medicines may be accumulated while superimposing each other and therefore the medicines need to be adjusted so as not to superimpose each other.

To this end, the rotation hopper 30 according to the present disclosure includes a vibrator 151 for separating the injected medicines from the interface at a predetermined distance or for separating the medicines from each other. As described above, since the inspector 400 photographs the injected medicines, the vibrator 151 is preferably disposed in the partition space in which the inspector 400 is disposed.

The vibrator 151 may be configured to vibrate a bottom surface of the partition space in which the inspector 400 is disposed. In this case, it may be configured in such a manner that vibrations may be applied to the bottom surface to disperse the medicines.

In addition to the above-described methods, the inspector 400 may also be configured to vibrate the partition member 120 constituting the partition space in which the inspector 400 is disposed. In this case, it may be configured in such a manner that the partition member 120 moves by a predetermined distance back and forth with respect to the transfer direction of the partition space. In this case, the rotation member 110 driving the partition member may serve as the vibrator 151.

As another method for separating the medicine adhered to the interface of the partition space C1 or the superimposed medicine, the injection part or the inspector may include an aligning member for aligning medicines received in the partition space C1.

The aligning member reciprocates the partition space C1 left or right or up and down when viewed in the vertical direction (that is, the direction viewed from the top surface). The aligning member may be configured to move the partition member, or may be configured to move the bottom surface of the partition space C1.

The aligning member may be configured to space the medicine apart from the partition member by a predetermined distance so as to prevent the partition member from being included in the medicine photographing image, and therefore the aligning member may also be formed of a transparent material and fit in the partition member. The aligning member will be described in more detail with reference to FIGS. 10 and 11.

On the other hand, the controller determines whether the medicine injected into the partition space C1 is fully omitted, partially omitted, over-injected, mis-injected, damaged, or is not recognized in the image analysis, compared to the medicines of the prescription.

At this time, the controller generally controls the rotation hopper 30 to perform the operations corresponding to the complete omission of the medicine, the partial omission of the medicine, the over-injection of the medicine, the mis-injection of the medicine, the damage of the medicine, and no recognition of the medicine and controls the discharge part 310 to discharge the injected medicine.

The discharge part 310 transfers the injected medicine toward the packing apparatus, and the controller causes a medicine corresponding to one pack, which match the medicines described in the prescription, to be discharged through the discharge part 310.

For example, as the inspection result, when the medicines injected into the partition space C1 are fully omitted on the prescription basis, the controller controls the injection parts 210A and 210B to again inject a medicine corresponding to one pack into the partition space C1 as the inspection result. In other words, the controller controls the medicine to drop from the cassette 3 and the tray 4 and the medicine to be injected into the partition space C1 again.

As another example, as the inspection result, when the medicines injected into the partition space C1 are partially omitted on the prescription basis, the controller controls the re-injection part 220 to inject only the omitted medicines into the partition space C1. In other words, the controller controls the re-injection part 220 to be supplied with the medicines omitted through the auxiliary tray or the external inlet 221 and inject the medicines into the partition space C1.

Next, the inspector 400 photographs the partition space C1, and the controller may analyze the image photographed by the inspector 400 to recognize the injected medicine and determine again whether the recognized medicine matches the medicines described in the prescription.

The disposal part 320 transfers the injected medicine toward the medicine disposal container. As the inspection result, when the medicines injected into the partition space C1 are over-injected, mis-injected, or damaged on the prescription basis, the controller may control the disposal part 320 to discard the medicines injected in the partition space C1.

The disposal part 320 may be disposed on a lower side with respect to the plane in which the N partition spaces rotate, in at least one of the N partition spaces. When the rotation hopper 30 is provided with only two partition spaces, it is preferable that the disposal part 320 is disposed in the partition space C1.

That is, as the inspection result, when the medicines injected into the partition space C1 are over-injected, mis-injected, or damaged on the prescription basis (in other words, when the matching of medicines with the prescription may not be possible only by the re-injection), the controller controls the disposal part 320 to be open to empty the partition space (C1). Thereafter, the controller closes the disposal part 320 and controls the medicine corresponding to one pack to be injected into the partition space C1 through the injection parts 210A and 210B.

As the inspection result, if the medicines injected into the partition space C1 match the prescription, the controller rotates the rotation member 110 to move the medicines received in the partition space C1 to the partition space C2 and opens the discharge part to discharge the inspected medicines to the packing apparatus.

As another exemplary embodiment, after a medicine corresponding to one pack are fully injected into the partition space C, the inspector may not perform the inspection by photographing the partition space C1 but perform the inspection in advance in the condition in which only some of the medicines are injected into the partition space C1.

Since the medicines prepared in the tray 4 may include the atypical medicines, the possibility of the mis-injection of the medicines may be higher than that of the medicines prepared in the cassette 3. Therefore, the medicines prepared in the tray 4 are first injected into the partition space C1 to perform the inspection, and as the inspection result, if there is an error in the injected medicines, the medicines may be discarded. That is, only the medicine injected from the tray 4 may be discarded. Therefore, it is possible to prevent a medicine corresponding to one pack from being fully discarded when the mis-injection occurs.

The disposition location of the injection parts 210A and 210B, the inspector 400, the re-injection part 220, and the discharge part 310 are not limited only to the case where the rotation hopper 30 has two partition spaces and may also be applied to the case where the rotation hopper 30 has two or more partition spaces.

In other words, the disposition locations of the injection parts 210A and 210B, the inspector 400, the re-injection part 220, and the discharge part 310 are not limited to the locations of the above-described partition spaces, and therefore may be appropriately changed without departing from the configuration of the group of medicines forming a medicine corresponding to one pack and the disposition relationship described above.

For example, the inspector 400 may be disposed in a partition space in which a last medicine of the group of medicines forming the medicines corresponding to one pack (that is, medicine list described in the prescription) is injected or may be disposed in any one of the subsequent partition spaces with respect to the transfer direction of the partition space and the re-injection part 220 may be disposed in the partition space in which the inspector 400 is disposed or may be disposed in any one of the subsequent partition spaces with respect to the transfer direction of the partition space.

Meanwhile, according to another exemplary embodiment, the medicine dispenser 10 may further include the display 500 for displaying the inspection details. At this time, the inspection details may include the mismatched details of the inspected medicines on the prescription basis.

Referring to FIG. 2, a case where the display 500 is included in the medicine dispenser 10 is illustrated, but the location of the display 500 is not limited thereto. For example, the display 500 may be provided on the lower body 20, or may also be provided to be supported on a table or a stand separately provided from the automatic medicine packing machine 1.

The display 500 may display, as the mismatched details, at least one of the full omission of the medicine, the partial omission of the medicine, the over-injection of the medicine, the mis-injection of the medicine, and the damage of the medicine as the inspection details. In addition, the display 500 may display no recognition details if the injected medicine is not recognized by the analysis of the photographed image. At this time, the displayed details may be displayed only in a text format or may also be displayed with the photographed image.

Meanwhile, the medicine dispenser including the rotation hopper 30 may further include the input 600 receiving an operation command to perform an operation corresponding to the inspection details. Specifically, it is possible to input the operation command to perform an operation corresponding to at least any one of the full omission of the medicine, the partial omission of the medicine, the over-injection of the medicine, the mis-injection of the medicine, the damage of the medicine, and no recognition of the medicine.

The input 600 may be a switch button for receiving the operation command or may be a touch input integrally provided with the display 500. The examiner may appropriately perform the operation of the medicine dispenser corresponding to the details displayed on the display 500 through the input 600.

As the inspection result, if the matching with the prescription is realized due to the re-injection of the medicines, the controller may open the external inlet 221 and display the omitted medicines on the display 500. The examiner inserts the omitted medicines into the external inlet 221 and operates the input 600 to allow the injected medicines to enter the medicine dispenser.

Figure 4:
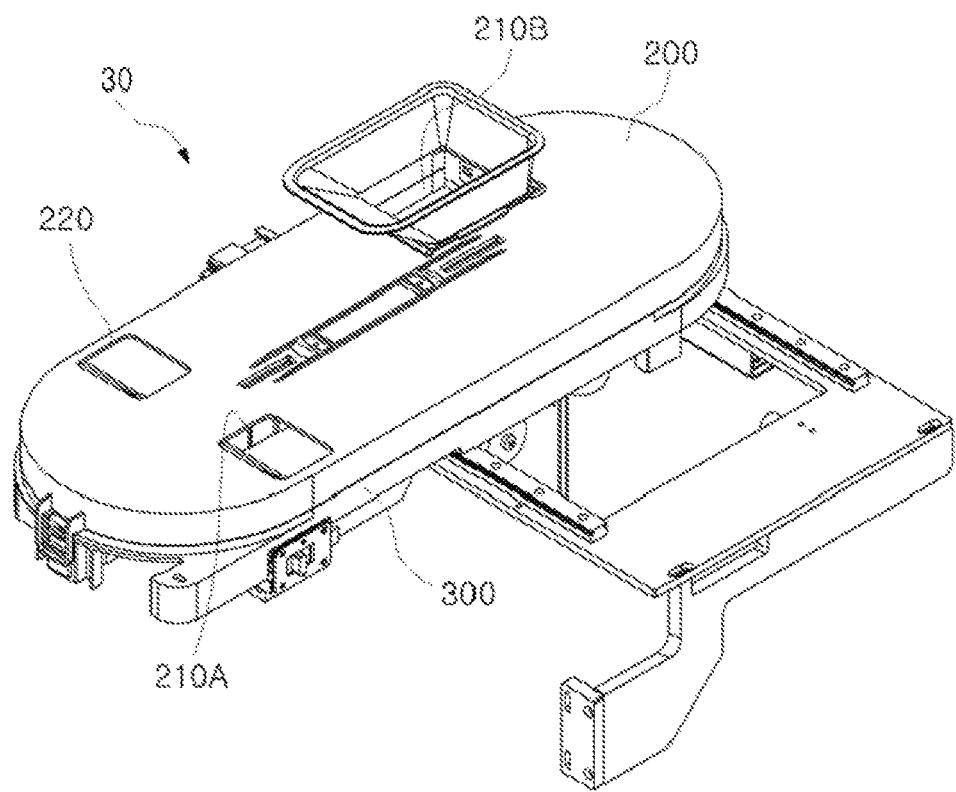
FIG. 4 is a perspective view of the rotation hopper of FIG. 3.
Figure 5:
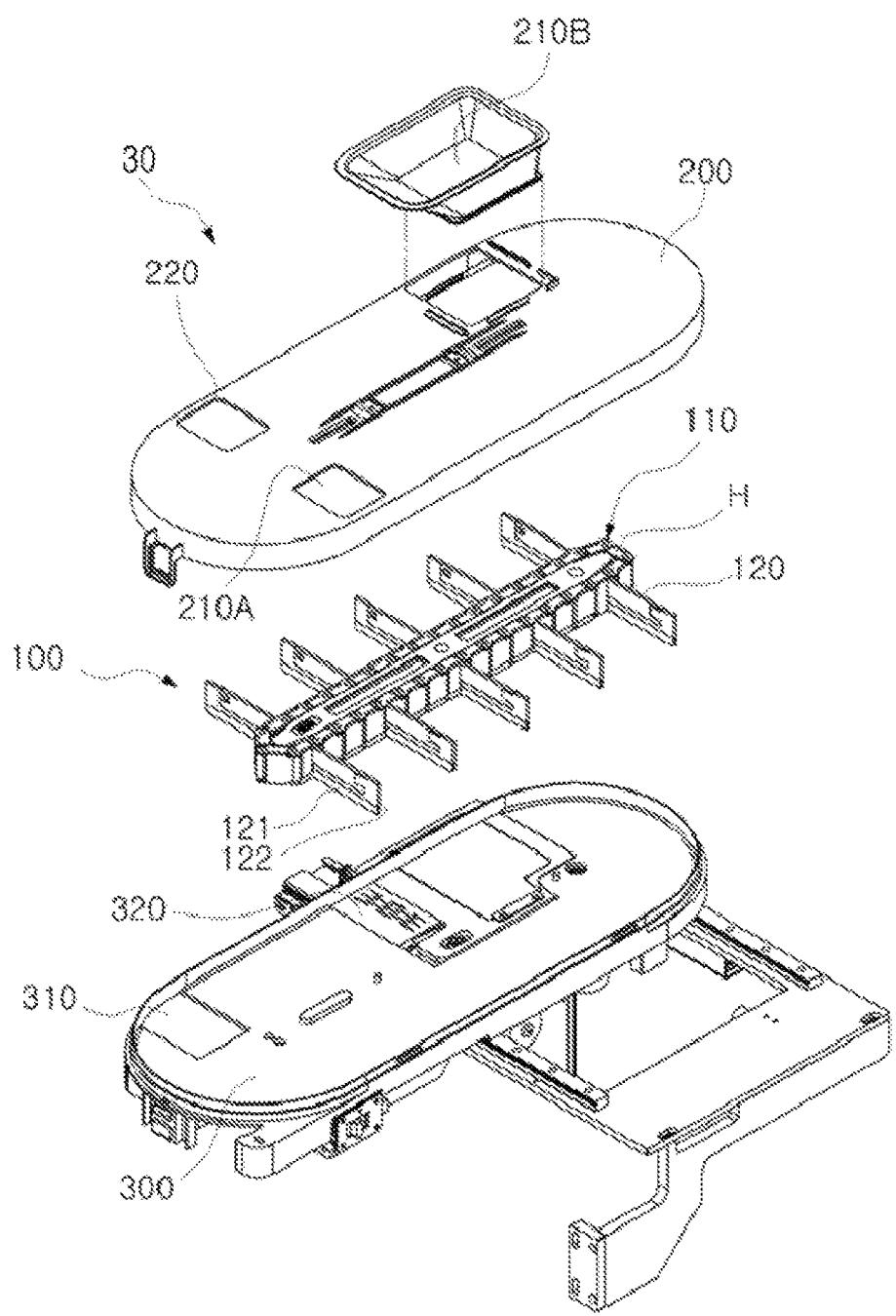
FIG. 5 is an exploded perspective view of the rotation hopper shown in FIG. 4.
Figure 6:
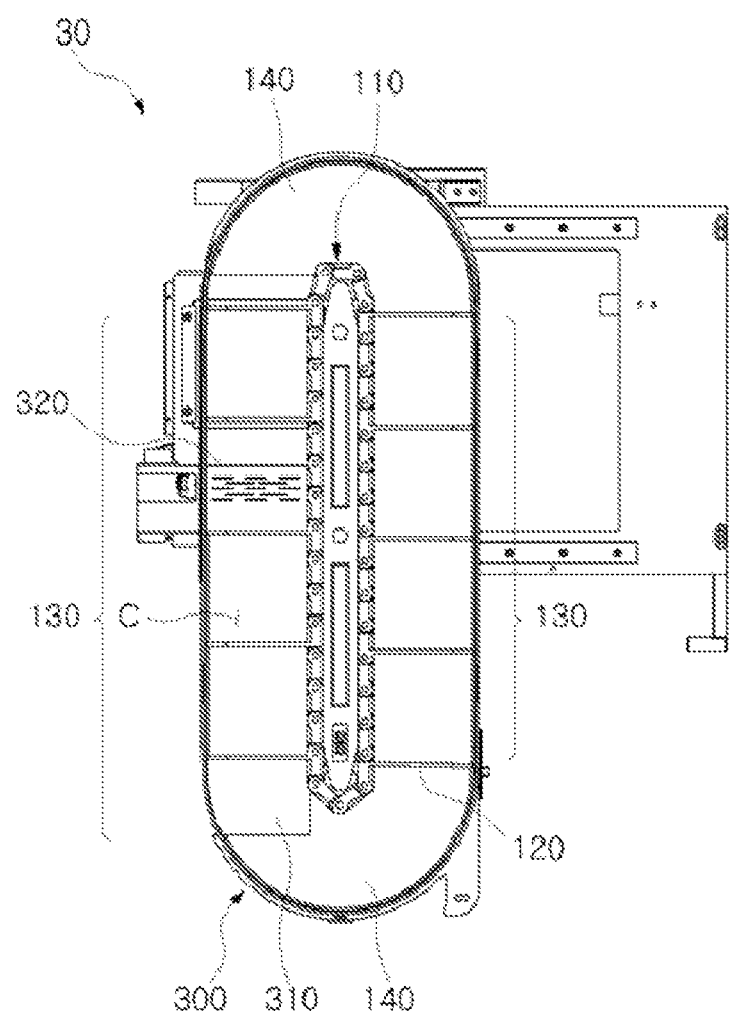
FIG. 6 is a plan view of the rotation hopper illustrated in FIG. 4 from which the upper case is removed.
Figure 7:
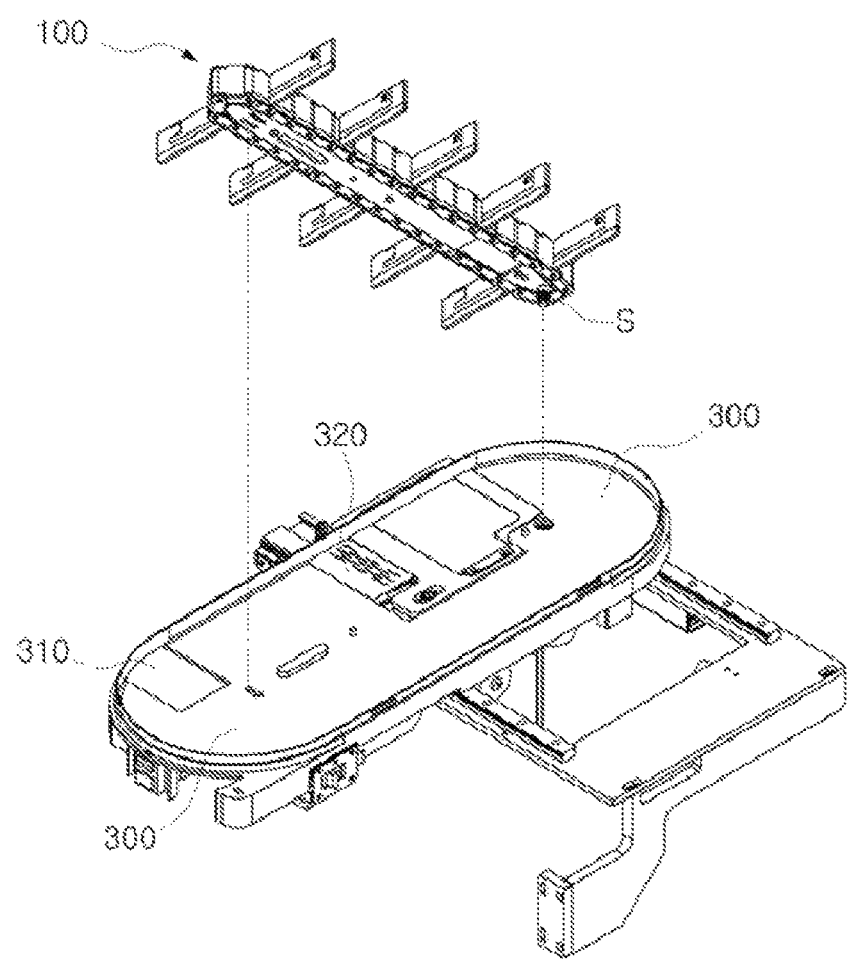
FIG. 7 is a partially exploded perspective view showing an appearance in which the rotation member is separated from the rotation hopper shown in FIG. 4.
Figure 8:
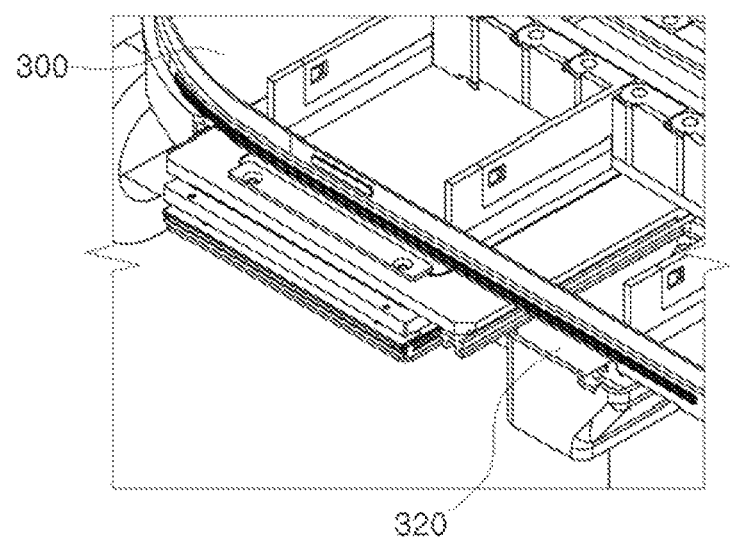
FIG. 8 is a partially exploded perspective view showing a medicine disposal part of the rotation hopper shown in FIG. 4.

FIG. 3 is a perspective view illustrating a part of a medicine packing apparatus including the rotation hopper according to the exemplary embodiment of the present disclosure and the injection part disposed on the upper portion of the rotation hopper, FIG. 4 is a perspective view of the rotation hopper of FIG. 3, FIG. 5 is an exploded perspective view of the rotation hopper shown in FIG. 4, FIG. 6 is a plan view of the rotation hopper illustrated in FIG. 4 from which the upper case is removed, FIG. 7 is a partially exploded perspective view showing an appearance in which the rotation member is separated from the rotation hopper shown in FIG. 4, and FIG. 8 is a partially exploded perspective view showing a medicine disposal part of the rotation hopper shown in FIG. 4.

Referring FIGS. 3 to 8, an example in which the rotation hopper 30 includes eight partition spaces will be described.

Referring to FIG. 5, the rotation hopper 30 includes a medicine rotation unit 100, an upper case 200, and a lower case 300.

Although the medicine rotation unit 100 is formed in a combination of a linear portion 130 and a curved portion 140, as shown, the medicine rotation unit 100 according to the present disclosure is not limited thereto and therefore may be formed in a circle. Further, the partition space C may be variously formed according to the shape of the rotation member 110 and the number and shape of partition members 120.

For convenience of explanation, the case where the medicine rotation unit 100 is formed in a combination of the linear portion 130 and the curved portion 140 and the upper case 200 and the lower case 300 corresponds to the shape of the medicine rotation unit 100 will be described as an example.

The injection parts 210A and 210B into which the medicines are injected are formed on the upper case 200. The injection parts 210A and 210B may be formed in one or in plural as needed, but the present exemplary embodiment illustrates that the two injection parts 210A and 210B are formed. Hereinafer, it is assumed that the first injection part 210A is for the purpose of injecting the medicines dropping from the tray 4 as needed for reasons that it may not be received in the cassette, and the second injection part 210B is for the purpose of injecting the medicines that may be received in the cassette. The first injection part 210A and the second injection part 210B may each be formed in the form of the hopper for guiding the medicines discharged from the tray and the cassette to the corresponding partition space.

In addition, the re-injection part 220 into which the omitted medicine is re-injected is disposed on the upper case 200. The re-injection part 220 may be realized in a form of a passage connected to the external inlet 221 through which the omitted medicines may be directly injected.

The lower case 300 forms the bottom of the partition space C in which the medicines are disposed and a first discharge part 320 and a second discharge part 310 through which the medicines are discharged are formed on the lower side. The medicines are transferred through the first discharge part 310 and move to the packaging part located under the rotation hopper 30 and are packaged.

The medicine rotation unit 100 is disposed between the upper case 200 and the lower case 300 and includes the rotation member 110 and the plurality of partition members 120.

The rotation member 110 is provided so as to be periodically rotatable by a driver (not shown). The partition member 120 intermittently rotates and thus is disposed in a radial direction while one end of the partition member 120 is fixed to the rotation member 110 so that the partition space C in which the medicines are disposed varies.

The rotation member 110 rotates the partition member 120, and the partition member 120 transfers the medicines by a rotational force for dispersing the medicines. The rotation unit 100 may secure an idle period before transferring the medicines to the adjacent partition spaces so as to have a medicine inspection time. That is, the rotation member 110 is capable of performing an intermittent transfer and a dribble transfer of the medicines injected by the intermittent driving. By the dribble, the medicines may be uniformly dispersed in the partition space C without being concentrated on the surface of the partition member 120.

The partition member 120 may be disposed to stand in the vertical direction, and a part of the partition member 120 may be formed of a flexible material to prevent the medicines from being damaged.

As shown in FIG. 5, the partition member 120 may include a lower portion 121 contacting the medicine and an end portion 122 contacting the medicine that may be formed of a flexible material.

Here, the rotation member 110 may be formed as a link to be easily coupled to the partition member 120 and one end of the partition member 120 is coupled to the rotation member 120 by a hinge H. Accordingly, the partition space C may vary according to the shape of the rotation member 110 and the disposition of the partition members 120, such that various partition spaces of the medicine rotation unit 100 may be easily set.

Referring to FIGS. 5 and 7, the upper case 200 and the medicine rotation unit 100 are detachably provided from the lower case 300, which may facilitate cleaning of the upper surface of the lower case 300. As shown in FIG. 7, the medicine rotation unit 100 is fixedly coupled to the lower case 300 by a detachable shaft S provided with a projection, or the like.

As shown in FIG. 6, the rotation unit 110 is formed of a pair of linear portions 130 facing each other and a pair of curved portions 140 facing each other and connecting both ends of the linear portion 130 on the plane.

Figure 9:
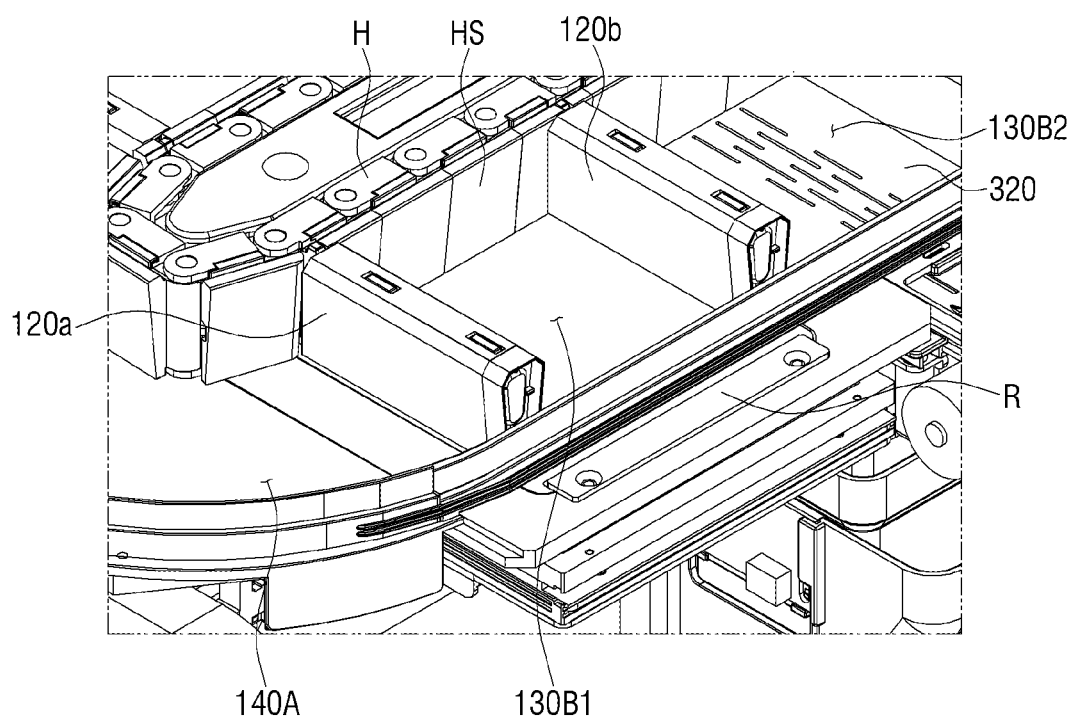
FIG. 9 is a plan view illustrating in detail the rotation hopper shown in FIG. 6.

FIG. 9 is a plan view illustrating in detail the rotation hopper shown in FIG. 6.

Referring to FIG. 9, the medicine rotation unit 100 includes a pair of linear portions 130A and 130B facing each other and a pair of curved portions 140A and 140B facing each other and connecting both ends of the pair of linear portions 130A and 130B on the plane. The medicine rotation unit 100 may further include the upper case 200 and the lower case 300 corresponding to the shape of the medicine rotation unit 100.

At this time, the partition space C disposed in the pair of linear portions 130A and 130B is formed in plural, and the partition space C disposed in the curved portions 140A and 140B may be formed in one. The partition space C may include a plurality of partition spaces 130A, 130A2, 130A3, 130A4, 130B1, 130B2, 130B3, and 130B4 disposed in the pair of linear portions 130A and 130B and the pair of curved portions 140A and 140B as shown in FIG. 9.

The first to eighth partition spaces 130A1, 130A2, 130A3, 130A4, 130B1, 130B2, 130B3, and 130B4 disposed in the linear portions 130A and 130B serve to perform at least one of the injection, waiting, inspection, discharge, and discard of the medicines. If necessary, at least any one of the injection, waiting, inspection, discharge and discard of medicines may also be disposed even in the curved portions 140A and 140B.

The first linear partition space 130A1 of any one of the partition spaces C is provided with the first injection part 210A serving as a primary injection of medicines. The fifth linear partition space 130B1 in the partition spaces C may be provided with the second injection part 210B serving to perform a secondary injection of medicines.

One side of the fifth partition space 130B1 may be provided with the inspector 400. That is, the fifth partition space 130B1 where the secondary injection of the medicine is made may directly perform the inspection of medicines. At this time, the medicines are naturally scattered due to the dropping. In some cases, the scattered medicines may come into contact with the interface of the fifth partition space 130B1, that is, the partition member 120.

In this case, since the medicine recognition rate may be lowered, it is necessary to separate the medicines from the partition member 120, and the rotation hopper 30 according to the present disclosure may include a vibrator R (see FIG. 2) that separates the injected medicines from the interface at a predetermined distance. The vibrator R is configured to move the bottom surface of the partition space 130B1 and is realized in such a manner that in the case of the form in which the bottom surface of the fifth partition space 130B1 moves, a vibration is applied to the bottom surface to disperse the medicines.

The vibrator R is realized in the form in which the partition member 120 forming the fifth partition space 130B1 moves. The vibrator R may be realized in such a manner that the partition member 120 moves by a predetermined distance back and forth with respect to the transfer direction of the partition space 130B1. In this case, the rotation member 110 for driving the partition member serves as the vibrator.

The medicines may be disposed so as not to be superimposed by the medicine aligning process by the vibrator R and therefore the vibrator R may minimize the time required for the medicine inspection.

On the other hand, the lower side of the sixth partition space 130B2 subsequent to the fifth partition space 130B1 with respect to the rotation direction of the transfer member 110 may be provided with the openable and closable disposal part 320 to discard the medicines so that the sixth partition space 130B2 communicates with the openable and closable disposal part 320.

In addition, of the curved portions 140A and 140B, the second curved portion 140B disposed subsequent to the partition space serving to discard the medicines with respect to the rotation direction may be provided with the discharge part 310. The medicines may be transferred to the packaging part through the discharge part 310 and may be packaged.

Figure 10:
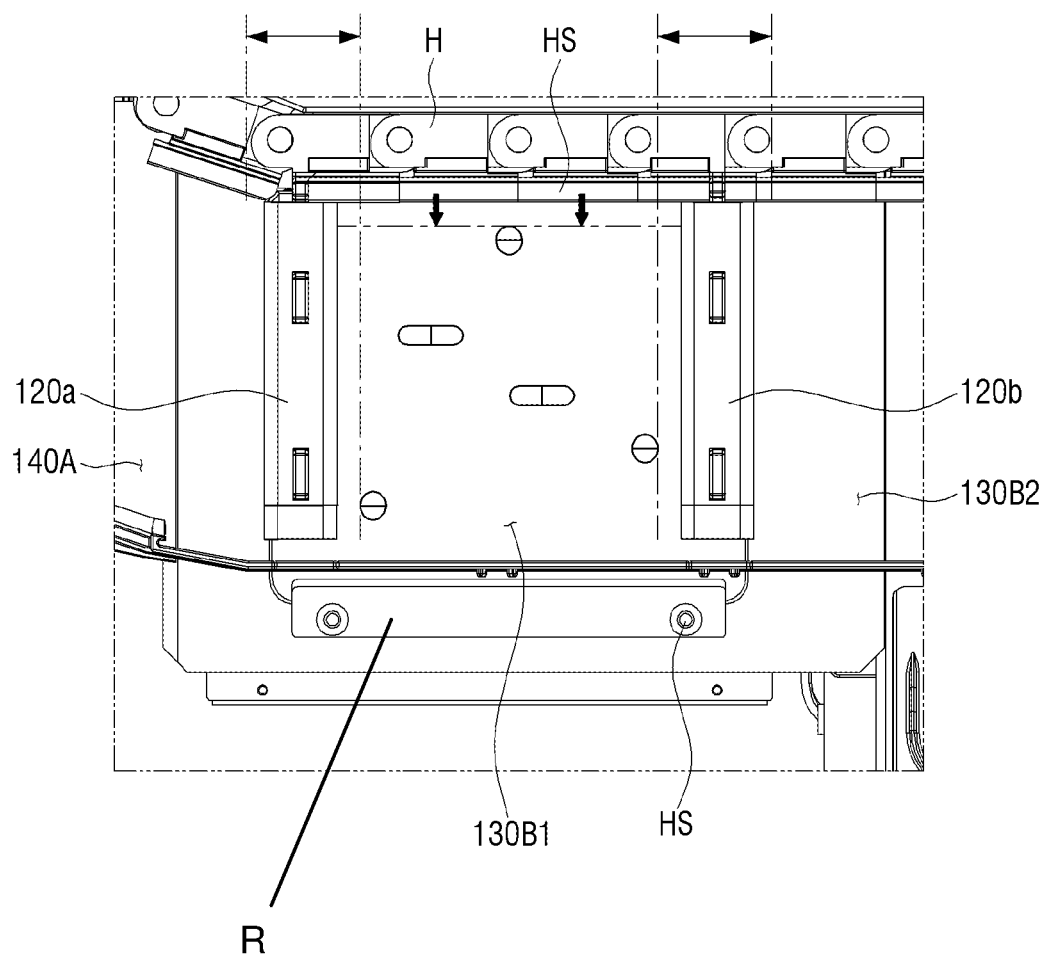
FIG. 10 is a perspective view showing a partition space corresponding to a location of the injection part of the rotation hopper shown in FIG. 4.
Figure 11:
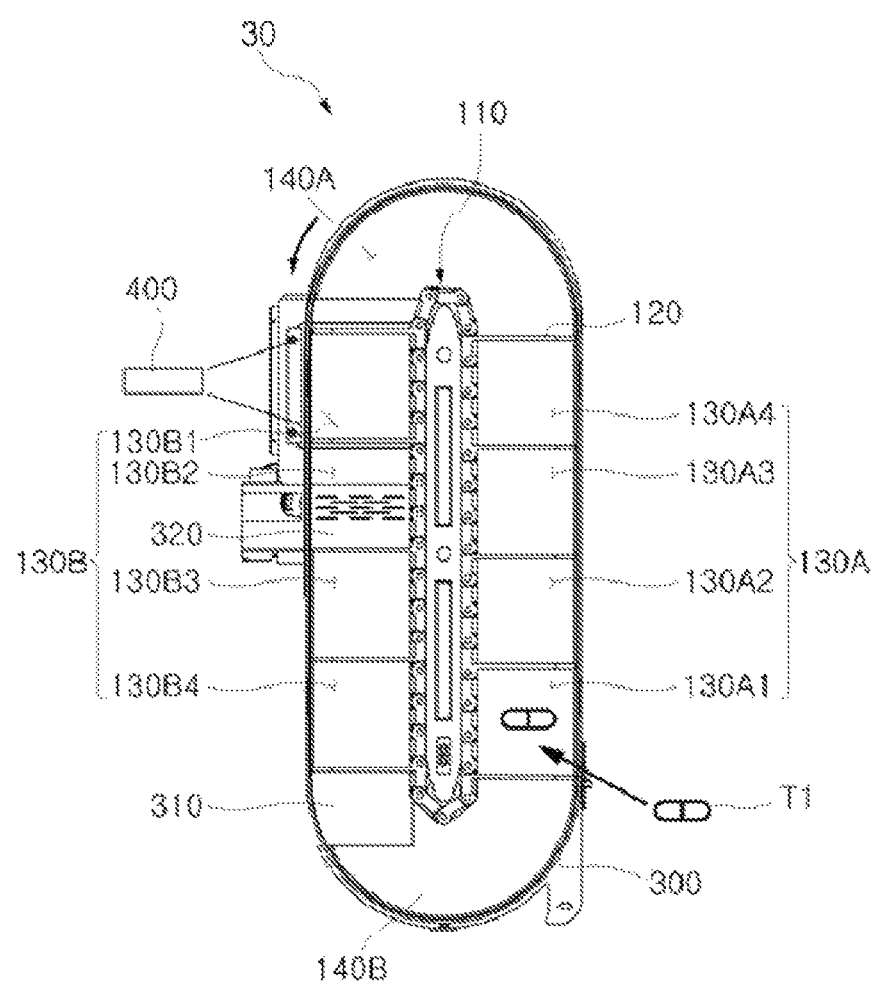
FIG. 11 is a top view of the partition space shown in FIG. 10.
Figure 12:
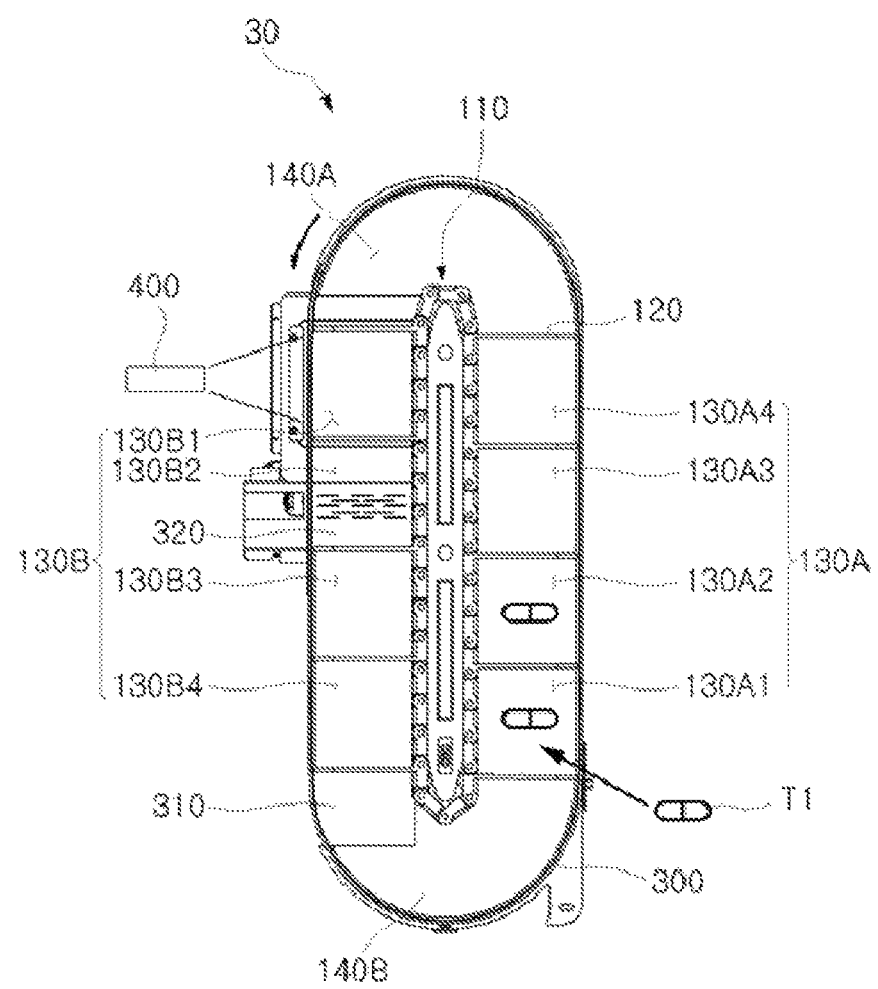
FIGS. 12 to 22 are longitudinal cross-sectional views illustrating an operation sequence of the medicine dispenser according to the exemplary embodiment of the present disclosure.
Figure 13:
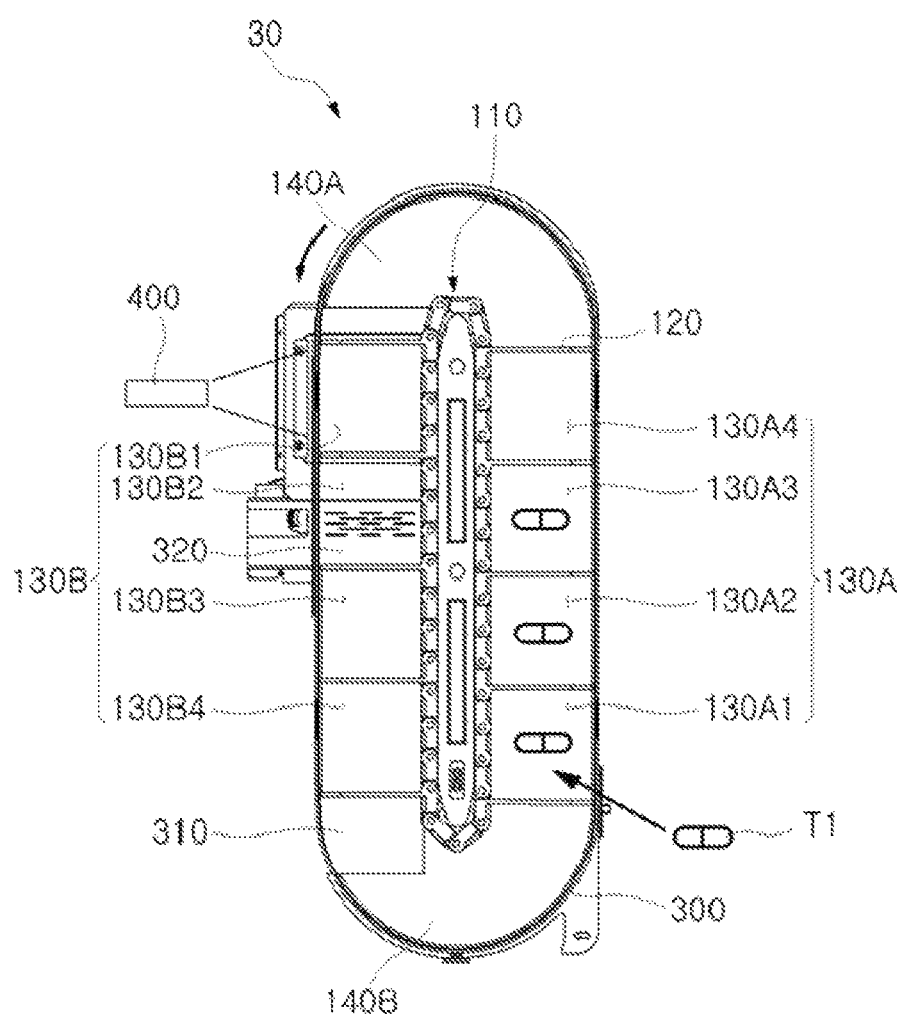
Figure 14:
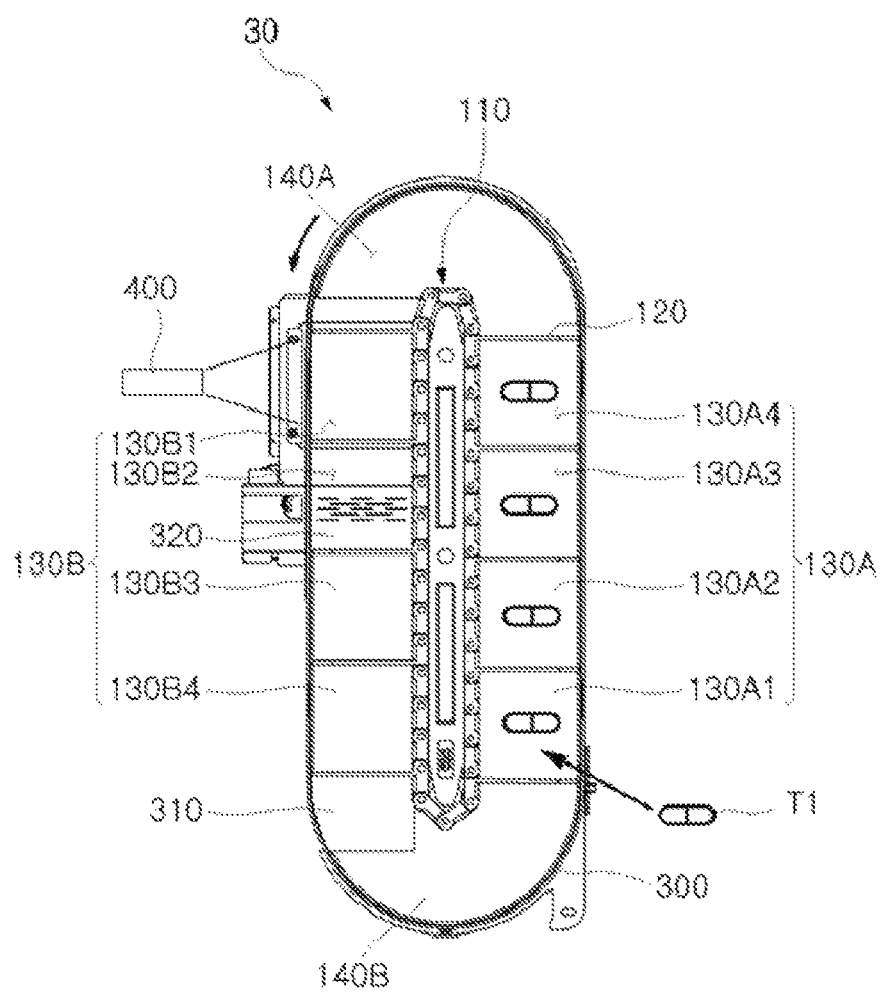

FIG. 10 is a partial perspective view showing a medicine disposal part of the medicine disposal shown in FIG. 4 and FIG. 11 is a top view of the partition space shown in FIG. 10.

When the injected medicines adhere to the partition members 120a and 120b forming the partition space 130B1 in which the inspector 400 is disposed, the case where the medicines are occluded by the partition members 120a and 120b may occur. As the method for separating the adhered medicines, the fifth partition space 130B1 in which the inspector 400 is disposed may be provided with the vibrator R.

The vibrator R is provided on the bottom surface of the fifth linear partition space 130B1 and may be connected to the driving member (not shown). When the driving member applies a discontinuous vibration to the vibrator R, the medicines may be dispersed to separate the medicines adhering to the partition members 120a and 120b.

According to another exemplary embodiment, the vibrator R may move by a spaced distance of medicines in the direction of the first curved portion 140A and the fifth linear partition space 130B by the driving member, and when the vibrator R moves, the medicines of the partition space 130B1 are aligned by the partition members 120a and 120b and therefore when the vibrator R returns to an original location, the medicines are spaced apart from the partition members 120a and 120b at a predetermined distance.

Meanwhile, the medicines adhering to the partition members 120a and 120b may be separated in such a manner that the rotation member 110 moves in the direction of the partition space 140A and the partition space 130B by a predetermined distance.

Further, a wall HS forming the hinge H of the rotation member 110 may be formed to protrude so as to separate the medicines adhering to the hinge wall HS.

Meanwhile, the partition member 120 may preferably have a form in which a width of an upper side and a width of a lower side are different, that is, a trapezoid. More specifically, the partition member 120 preferably has a trapezoidal section in which the width of the upper side is longer than the width of the lower side. When the inspector 400 photographs the sixth linear partition space 130B2 by allowing the upper side of the partition member 120 to be inclined in the direction of the sixth linear partition space 130B2 as described above, it is possible to prevent illumination from being reflected from the partition member 120.

Also, at least one surface of the fifth linear partition space 130B1 in which the inspector 400 is disposed may be formed of a material through which light is transmitted to prevent shadow from being generated in a medicine. For example, a surface forming the bottom of the partition space 130B1 may be formed of a light transmitting material or the partition member 120 may be formed of the light transmitting material.

The bottom of the fifth linear partition space 130B1 is formed of the light transmitting material to illuminate light for photographing on the lower side (i.e., aligning member R) forming the fifth linear partition space 130B1. In addition, when the partition member 120 is formed of the light transmitting material, it is possible to eliminate a place where light is not illuminated, thereby preventing shadow from being generated in the medicine to be photographed.

FIGS. 12 to 22 are longitudinal cross-sectional views illustrating an operation sequence of the medicine dispenser according to the exemplary embodiment of the present disclosure. The injected medicines may be composed of various kinds of groups of medicines. However, for convenience of explanation, a first group of medicines T1 injected from the tray and a second group of medicines T2 injected from the cassette will be described by way of example with reference to FIGS. 12 to 22. It is assumed that the list of medicines (medicines corresponding to one pack) described in the prescription consists of the first group of medicines T1 and the second group of medicines T2 and medicines corresponding to a single dosage that a patient takes are the same. For convenience of illustration, the first group of medicines T1 and the second group of medicines T2 are each shown by one tablet.

In the present exemplary embodiment, the rotation member 110 may rotate forward or reversely. The forward rotation direction is counterclockwise.

Figure 15:
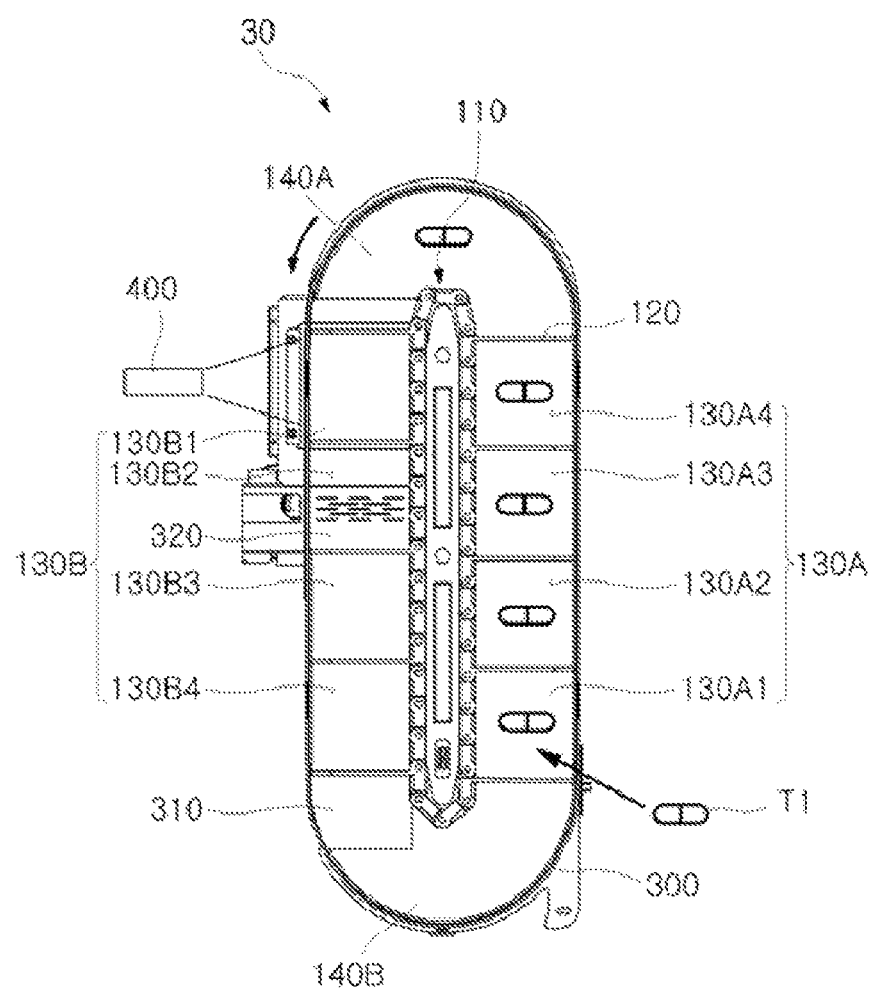

As shown in FIG. 15, the first group of medicines T1 is injected into the first linear partition space 130A1 through the injection part 210A. When the injection is completed, the rotation member 110 rotates by one partition space and moves the first group of medicines T1 injected into the first linear partition space 130A1 to the second linear partition space 130A2. Here, the "rotation" of the rotation member 110 does not have a limited meaning of the rotation about the rotation axis but is used to explain the operation of transferring the partition spaces, which are formed by the rotation member 110 and the partition member 120, by the rotation of the rotation member 110. That is, the "rotation" also includes an operation of allowing the partition space to reciprocate a specific section.

When the movement is performed, the first group of medicines T1 is again injected into the first linear partition space 130A1 through the injection part 210A. The process is repeated to move the first group of injected medicines T1 to the first curved portion 140A and the first group of medicines T is injected into and received in the first to fourth linear partition spaces 130A1, 130A2, 130A3, and 130A4, respectively.

Figure 16:
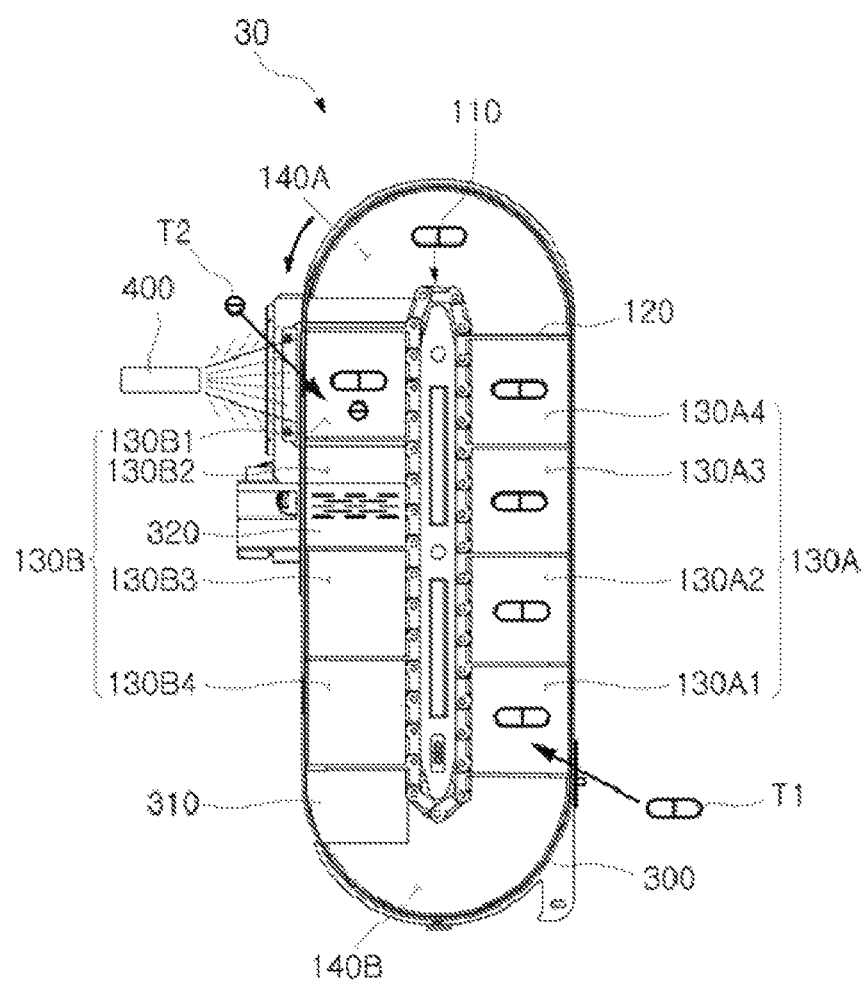

Subsequently, as shown in FIG. 16, the first group of medicines T1 moves to the fifth linear partition space 130B1. At this time, the second group of medicines T2 is injected into the fifth linear partition space 130B1 through the second injection part 210B. That is, the injection of medicines (the first group of medicines T1 and the second group of medicines T2) corresponding to one pack on the prescription basis into the fifth linear partition space 130B1 is completed.

If the second group of medicines T2 is injected, the inspector 400 photographs the fifth linear partition space 130B1. Since the inspector 400 includes an image input device and an illumination device, the image of the fifth linear partition space 130B1 may be obtained. The photographed image is transmitted to the controller and the controller analyzes the photographed image to recognize the injected medicines and determine whether the recognized medicines match the prescription.

The controller may compare the image photographed by the inspector 400 with the prescription information previously input to determine whether the first group of medicines T1 and the second group of medicines T2 injected into the fifth linear partition space 130B1 match the prescription or are mismatched with the prescription.

At this time, the mismatch between the inspected medicines and the medicines of the prescription may include at least one of the full omission of the medicine, the partial omission of the medicine, the over-injection of the medicine, the mis-injection of the medicine, and the damage of the medicine. The operation of the controller depending on the mismatch result was described with respect to FIG. 1 and therefore the overlapping description will be omitted.

Figure 17:
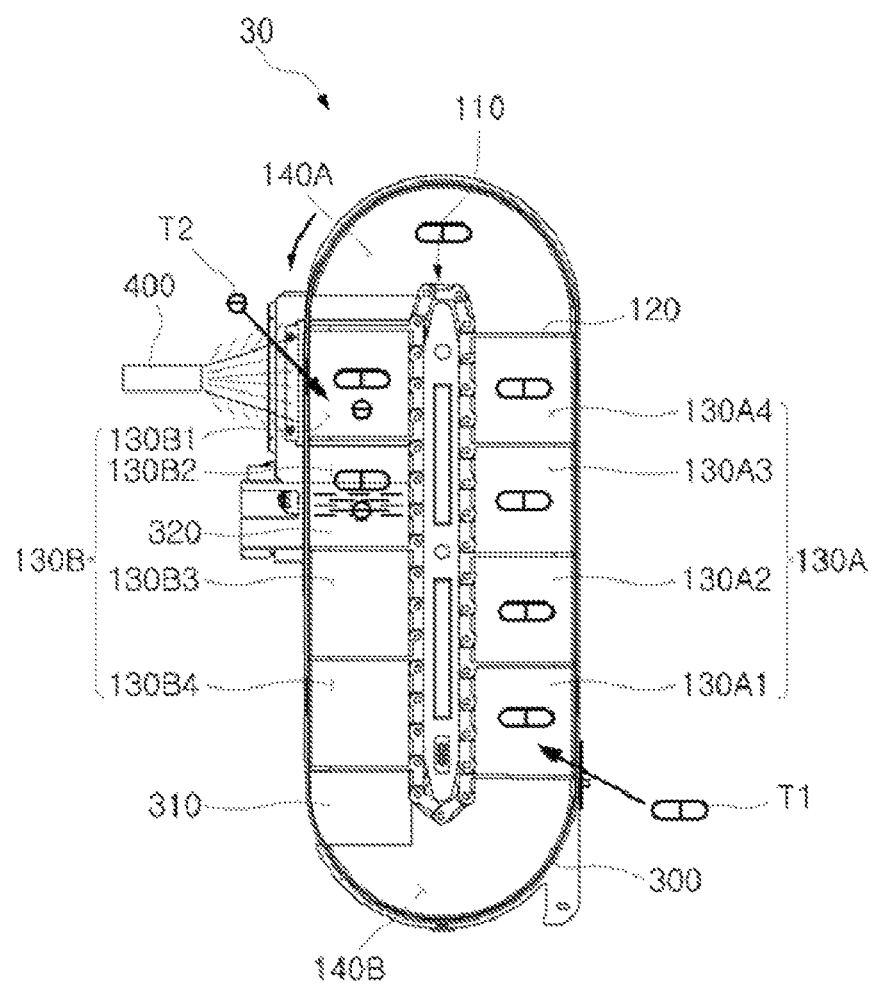

FIG. 17 shows a case where the first group of medicines T1 and the second group of medicines T2 injected into the fifth linear partition space 130B1 match the prescription as the inspection result. As shown, the rotation member 110 rotates by one partition space to move the first group of medicines T1 and the second group of medicines T2 that are injected into the fifth linear partition space 130B1 to the partition space 130B2 and the second group of medicines T2 is injected into the fifth linear partition space 130B1. That is, it may be appreciated that the injection of the medicines T1 and T2 corresponding to one pack on the prescription basis into the fifth linear partition space 130B1 is completed and the medicines included in the fifth linear partition space 130B1 are photographed by the inspector 400. Although not shown, in FIG. 16, if at least any one of the first group of medicines T1 and the second group of medicines T2 injected into the fifth linear partition space 130B1 does not match the prescription and the mismatched details correspond to at least any one of the over-injection of the medicine, the mis-injection of the medicine, and the damage of the medicine, the disposal part 320 provided in the partition space 130B2 is open and thus the medicines in the corresponding space are discarded.

Figure 18:
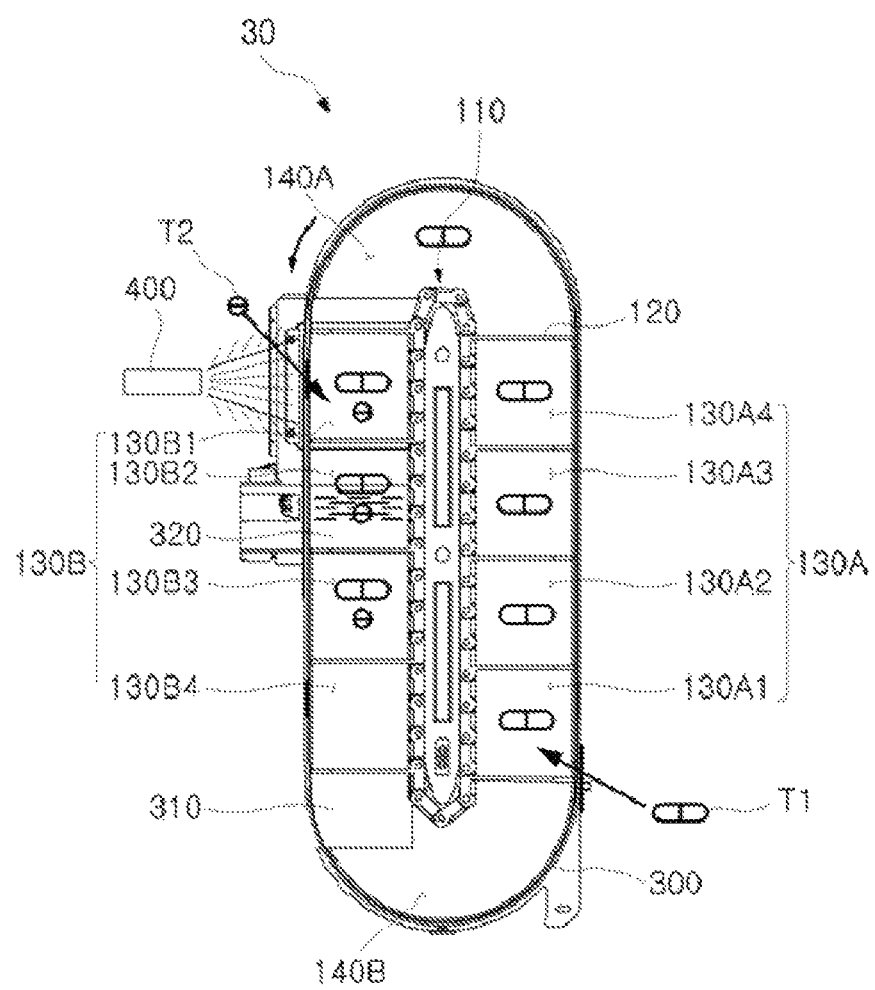

FIG. 18 shows the case where the first group of medicines T1 and the second group of medicines T2 injected into the fifth linear partition space 130B1 match the prescription as the inspection result. The rotation member 110 rotates by one partition space to move the first group of medicines T1 and the second group of medicines T2 injected into the fifth linear partition space 130B1 to the sixth linear partition space 130B2, move the first group of medicines T1 and the second group of medicines T2 of the sixth linear partition space 130B2 to the seventh linear partition space 130B3, and inject the second group of medicines T2 into the fifth linear partition space 130B1. That is, it may be appreciated that the injection of the medicines T1 and T2 corresponding to one pack on the prescription basis into the fifth linear partition space 130B1 is completed and the medicines after the completion of the injection are photographed by the inspector 400.

Figure 19:
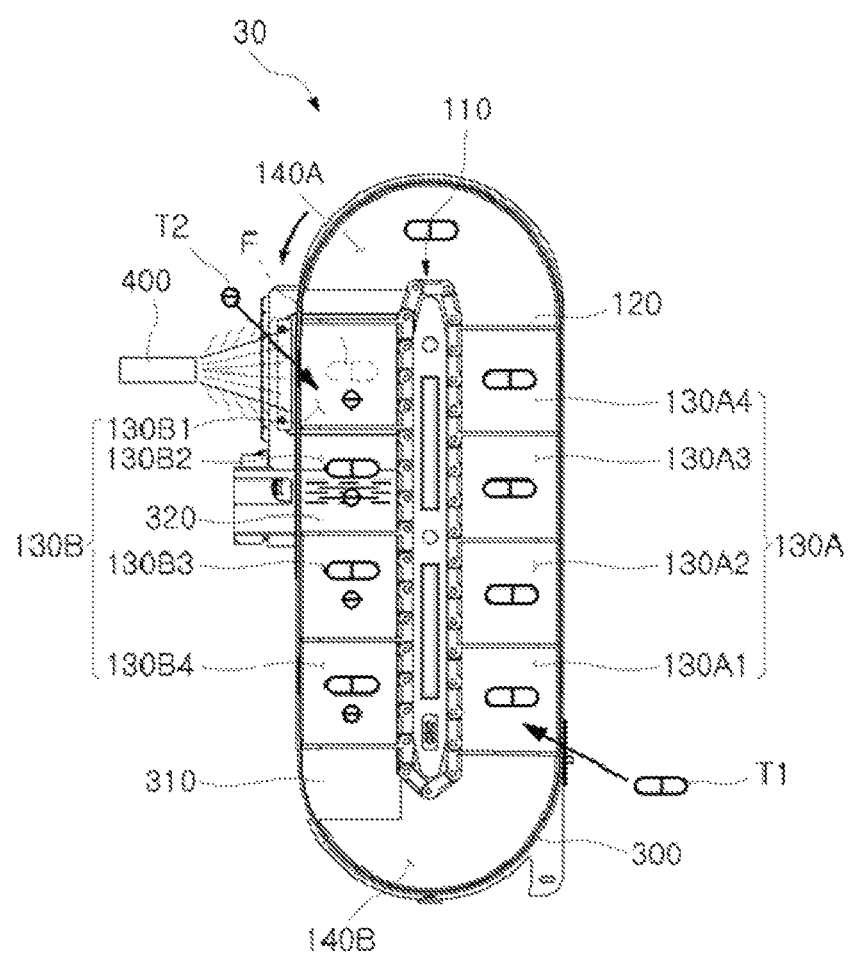

FIG. 19 shows the full omission or the partial omission of the first group of medicines T1 in a case F where the first group of medicines T1 and the second group of medicines T2 injected into the fifth linear partition space 130B1 do not match the prescription. For convenience of illustration, the first group of medicines T1 and the second group of medicines T2 are each shown as one tablet. One displayed by a dotted line in the fifth linear partition space 130B1 may mean the full omission or the partial omission of the first group of medicines T1.

Figure 20:
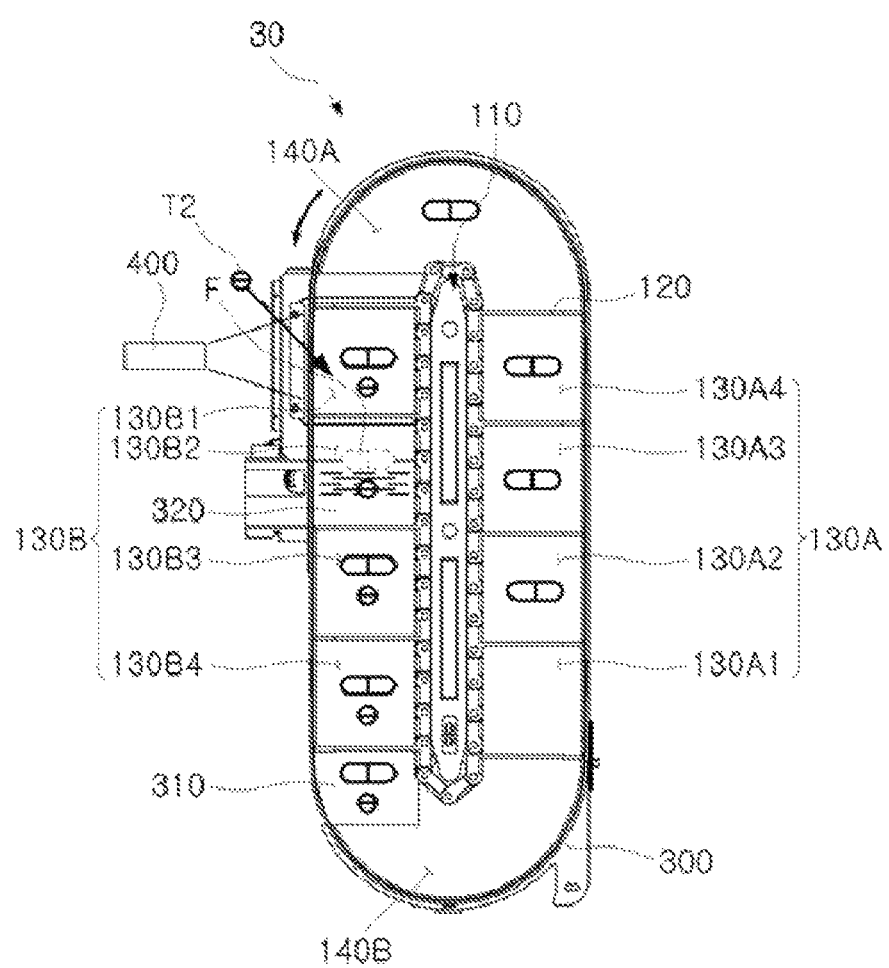
Figure 21:
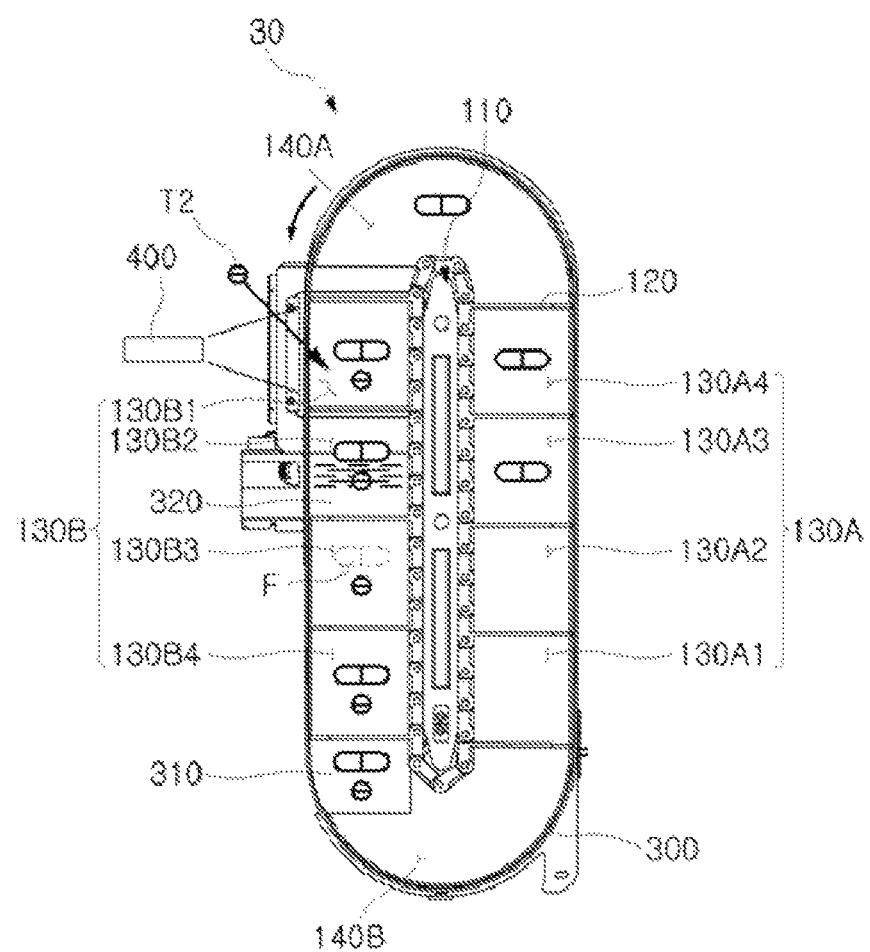

FIGS. 20 and 21 each show the case where the first group of medicines T1 and the second group of medicines T2 injected into the fifth linear partition space 130B1 match the prescription as the inspection result. The rotation member 110 rotates by one partition space to move the first group of medicines T1 and the second group of medicines T2 injected into the fifth linear partition space 130B1 to the sixth linear partition space 130B2, move the first group of medicines T1 and the second group of medicines T2 of the sixth linear partition space 130B2 to the seventh linear partition space 130B3, move the first group of medicines T1 and the second group of medicines T2 of the seventh linear partition space 130B3 to the eighth linear partition space 130B4, move the first group of medicines T1 and the second group of medicines T2 of the eighth linear partition space 130B4 to the second curved portion 140B, and inject the second group of medicines T2 into the fifth linear partition space 130B1. That is, it may be appreciated that the injection of the medicines T1 and T2 corresponding to one pack on the prescription basis into the fifth linear partition space 130B1 is completed and the medicines after the completion of the injection are photographed by the inspector 400.

The discharge part 310 is disposed in the second curved portion 140B and the controller opens the discharge part 310 to dispense the first group of medicines T1 and the second group of medicines T2 matching the prescription and corresponding to one pack to the packing apparatus.

Figure 22:
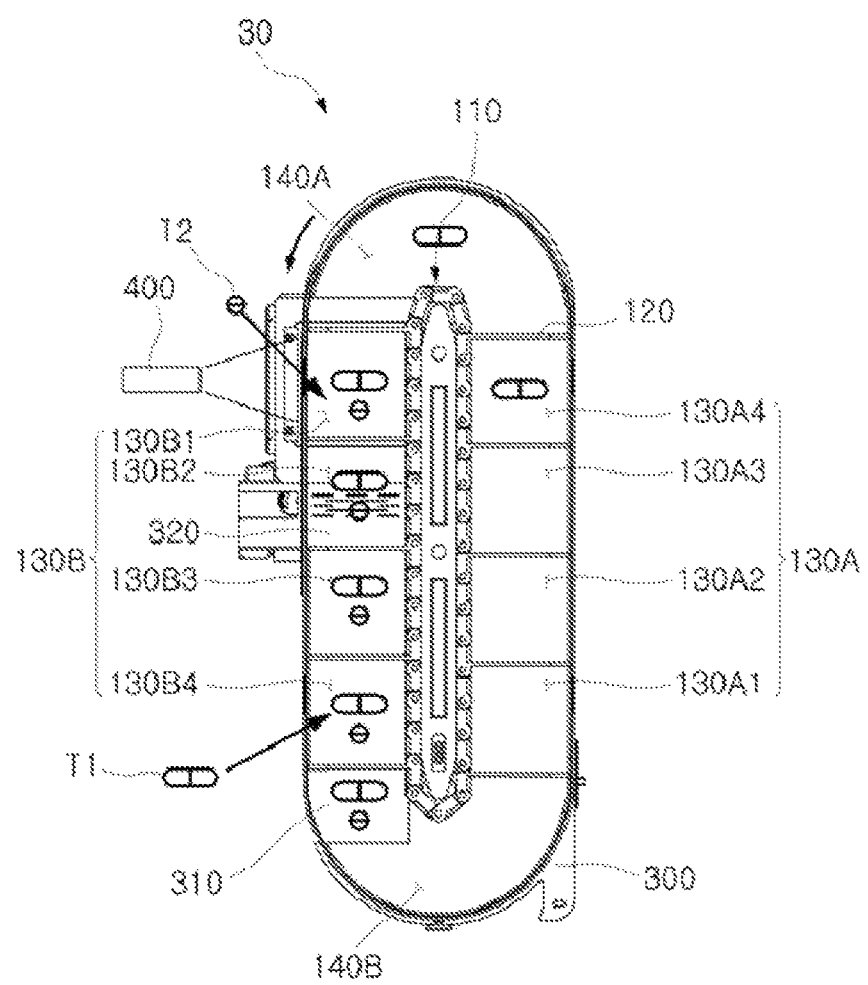

FIG. 22 shows a situation in which the group of medicines in which the omitted medicines are generated moves to the eighth linear partition space 130B4 where the re-injection part 220 is disposed.

The controller recognizes the omitted medicines and records the location of the partition space in which the omitted medicines are generated and then displays the omitted details on the display 500 when the group of medicines in which the omitted medicines are generated moves to the eighth linear partition space 130B4 in which the re-injection part 220 is disposed, and controls the external inlet 221 to be open so that the omitted medicines are re-injected through the external inlet 221. That is, the omitted medicines are injected into the eighth linear partition space 130B4 in order to match with the medicines of the prescription.

As shown in FIGS. 2 and 3, the external inlet 221 is an inlet connected to a separate hopper from the hopper for collecting the medicine dropping from the cassette 3 and the tray 4 and is an inlet through which medicines are directly injected into the partition space 130B4 from the outside of the automatic medicine packing machine 1. It is preferable that the external inlet 221 is located above the packing part, more preferably above the partition space 130B4. According to the disposition of the external inlet 221, the re-injected medicines may be injected into the partition space 130B4 by dropping due to gravity.

By the external inlet 221, since the omitted medicines may be input directly into the partition space 130B4, the operation of separating the re-injected medicine storing box from the medicine dispenser 10 for the re-injection of the omitted medicines and putting the omitted medicines into the re-injected medicine storing box, and reloading it into the medicine dispenser 10 may be omitted.

On the other hand, although not shown in FIG. 19, if the second group of medicines T2 of the fifth linear partition space 130B1 does not match the prescription and the mismatched details are the full omission or partial omission of the second group of medicines T2, the controller does not discard the medicines by opening the disposal part 320 when the medicines of the corresponding partition space move to the partition space 130B2 but sequentially rotates once or rotates it in a reverse direction to re-inject the second group of medicines omitted when the medicines are located in the fifth linear partition space 130B1. That is, when the medicines are transferred to the second curved portion 140B while the medicines are omitted, the controller may control the medicines to pass without opening the discharge part 310 and the first group of medicines T1 not to be injected when the medicines are located in the first linear partition space 130A1.

If the second group of medicines T2 of the fifth linear partition space 130B1 does not match the prescription and the mismatched details are the full omission or the partial omission of the second group of medicines T2, the controller may control the rotation of the partition space to temporarily stop and only the omitted medicines from the second group of medicines T2 to be re-injected from the cassette. If necessary, the omitted medicines from the second group of medicines T2 may be re-injected and then may be again inspected by the inspector 400.

Figure 23:
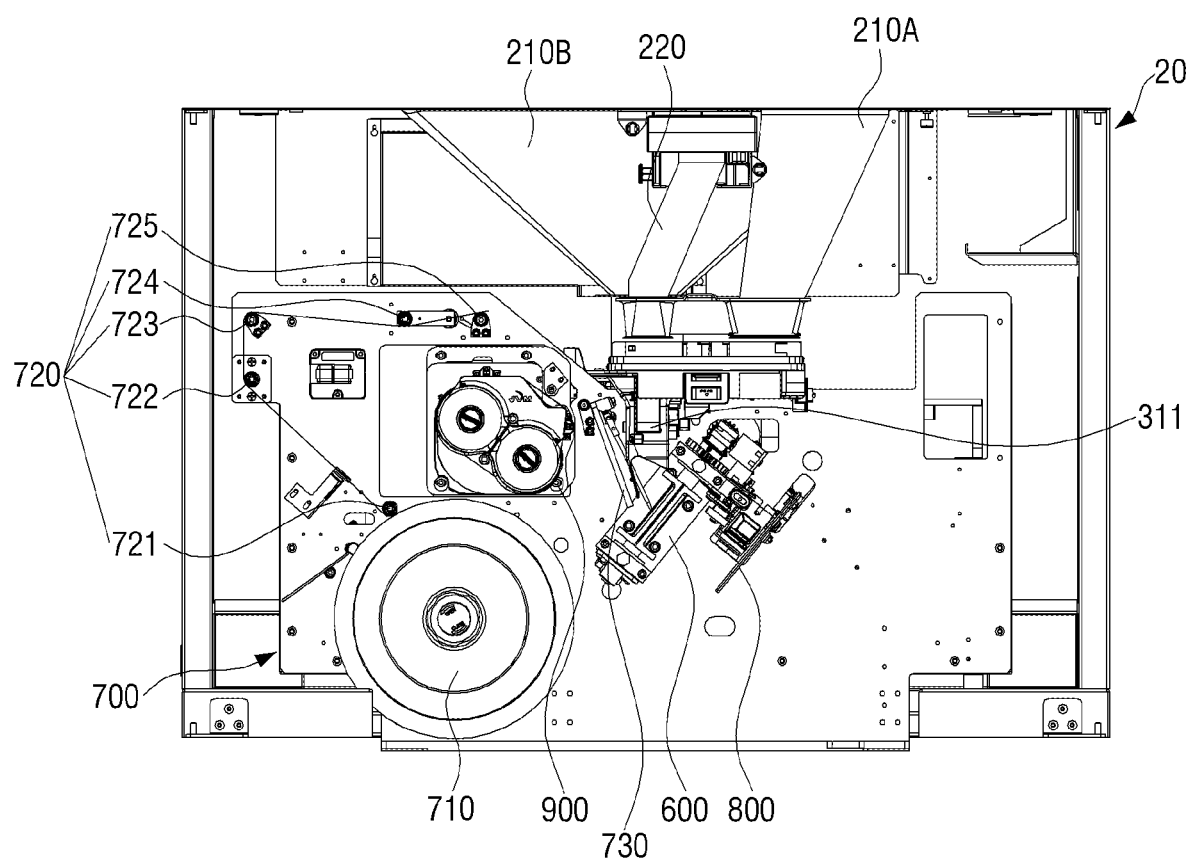
FIG. 23 is a front view showing a lower body including a medicine dispenser and a packing apparatus according to an exemplary embodiment of the present disclosure.

FIG. 23 is a front view showing a lower body including a medicine dispenser and a packing apparatus according to an exemplary embodiment of the present disclosure.

Referring to FIG. 23, a packing apparatus 700 includes a medicine package feeder 710, a guide roller 720, a medicine sheet folder 730, and a sealer 600. The packing apparatus 700 packages the medicines dispensed from the rotation hopper 30 in the medicine package.

The medicine package feeder 710 feeds a medicine sheet P. The medicine sheet P is received in a roll form before packaging the medicines, and the medicine sheet P is fed by a length required for the packaging of the medicines every time the inspected medicines corresponding to one pack are dispensed from the rotation hopper 30. The medicine sheet P may be fed in a roll form for receiving and feeding efficiency.

The guide roller 720 includes a plurality of roller members so that the medicine sheet P is continuously fed to the rotation hopper. The guide roller 720 switches the feeding direction of the medicine sheet P, thereby improving the space utilization of the lower body 20.

The medicine sheet folder 730 folds the medicine sheet P in a half width with respect to the feeding direction of the medicine sheet P so that it has a bag form to receive the medicines. The medicine sheet folder 730 folds the medicine sheet P fed in the state in which the medicine sheet P is unfolded by a triangular member in half. At this point, a medicine receiving space A like a pocket formed by a left half medicine sheet and a right half medicine sheet is formed while the medicine sheet P is folded in half.

The medicine sheet folder 730 is disposed on the side of the discharge part 310 of the rotation hopper 30 and the inspected medicines corresponding to one pack are injected into the medicine receiving space A by the opening of the discharge part 310. To efficiently utilize the medicine receiving space of the medicine sheet, the medicine sheet folder 730 may be disposed at approximately 45° downward with respect to the disposition surface of the rotation hopper 30 on the lower surface of the rotation hopper 30. By the disposition, the width of the upper open surface of the medicine receiving space A may be increased.

A marking apparatus 800 performs marking on the medicine package in which the medicines are packaged depending on the medicine inspection results. At this time, the marking may be performed by attaching a sticker type adhesive member so as to be removable from the medicine package or may be performed by using any one of a ketone type board maker, an alcohol type board maker, and an aqueous board maker so as to be erased from the medicine package.

As shown, the marking apparatus 800 is disposed at the rear end of the packing apparatus 700 with respect to a traveling direction of the medicine sheet P which is only one exemplary embodiment. Therefore, the marking apparatus 800 is provided as one of the components forming the packing apparatus 700 to perform the marking simultaneously with the packaging.

The medicine inspection is performed by the rotation hopper 30, and the case where the medicine inspection results do not match the list of the prescription may be arranged as follows.

Even when the inspection result on the medicines does not match the prescription, if the controller is set to allow the rotation hopper 30 to perform the packaging, the marking may be performed on each of the medicine packages depending on the medicine inspection result.

That is, if the inspection results indicate that the medicine quantity is insufficient, the marking apparatus 800 performs marking corresponding to "omission" on the medicine package in which the corresponding medicines are packaged, if the inspection results indicate that the medicine quantity is large, the marking apparatus performs marking corresponding to "over-injection" on the medicine package in which the corresponding medicines are packaged, and if the inspection results indicate that some of the medicines do not match the list of the prescription, the marking apparatus performs marking corresponding to "mis-injection" on the medicine package in which the corresponding medicines are packaged.

However, if the medicines that do not match the list of the prescription are packaged as they are, the medicines waste, so that the setting of the controller may be changed as needed.

According to the setting of the controller, only when the medicines are mis-injected, the medicines that do not match the prescription are packaged. In the remaining cases, only the medicines matching the list of the prescription are packaged by the process of re-injecting the omitted medicines, discarding the mis-injected medicines, re-injecting the medicines, or the like.

At this time, even in the case of the mis-injection, since there are many detailed cases, the marking may be set depending on the setting of the controller.

Even if the medicines do not match the prescription list, the medicine quantity is the same and if some of the medicines are not recognized, no recognition of the medicines may occur for the reasons such as the superposition of the medicines. In this case, the packaging proceeds and the examiner inspects the marked medicine package with the naked eyes later to determine whether the medicine package is normal or not. At this time, since the marking is indicated by the removable method from the medicine package, when the marked medicine package matches the prescription depending on the check of the examiner later, the medicine package may be changed to the normal medicine package only by removing the marking.

A prescription information marking apparatus 900 marks the prescription information on the medicine sheet P.

The prescription information marking apparatus 900 may include a printing means to mark the prescription information on the medicine sheet P by a printing manner. Alternatively, a means for attaching a printed matter on which the prescription information is printed to the medicine sheet P may be provided. Alternatively, the prescription information marking apparatus 900 may be implemented as a simple printer.

The prescription information marking apparatus 900 may be disposed at a front end of the marking apparatus 800 with respect to the packaging direction of the medicine sheet P.

Figure 24:
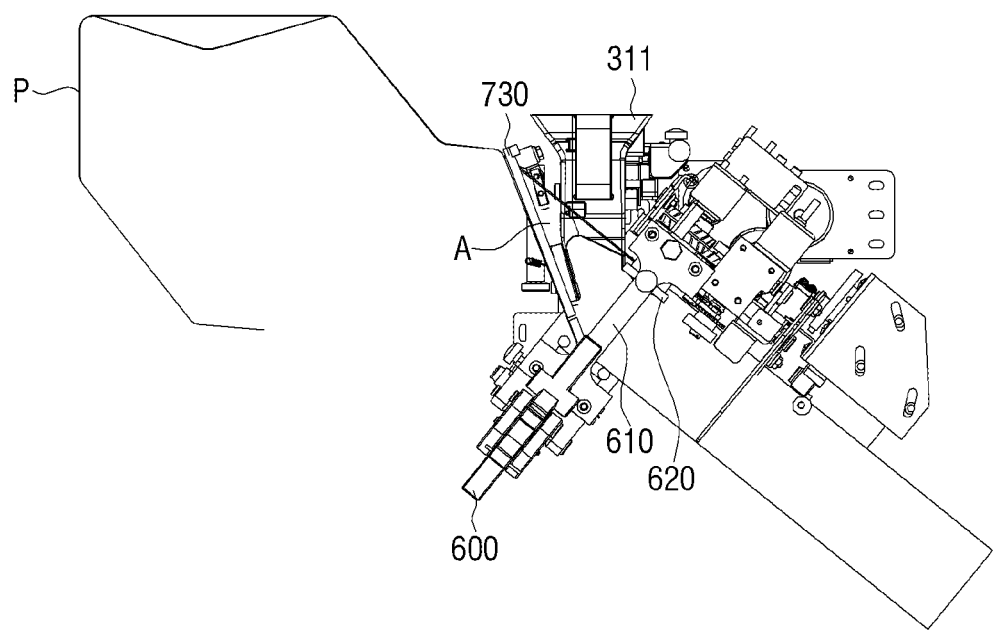
FIG. 24 is a front view showing a sealing apparatus.
Figure 25:
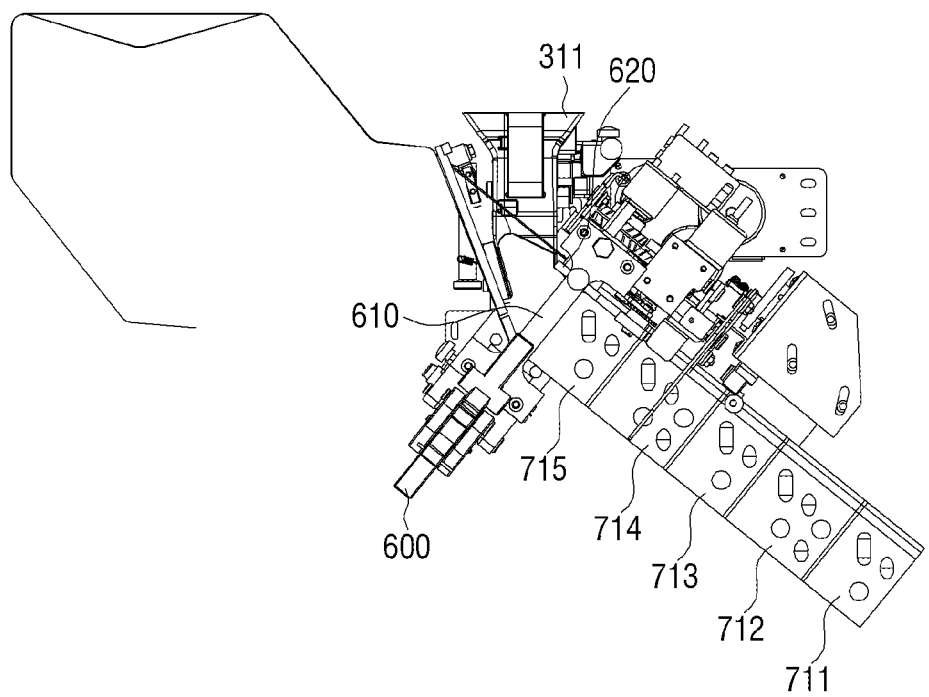
FIG. 25 is a view showing a medicine sheet whose length is variable.
Figure 26:
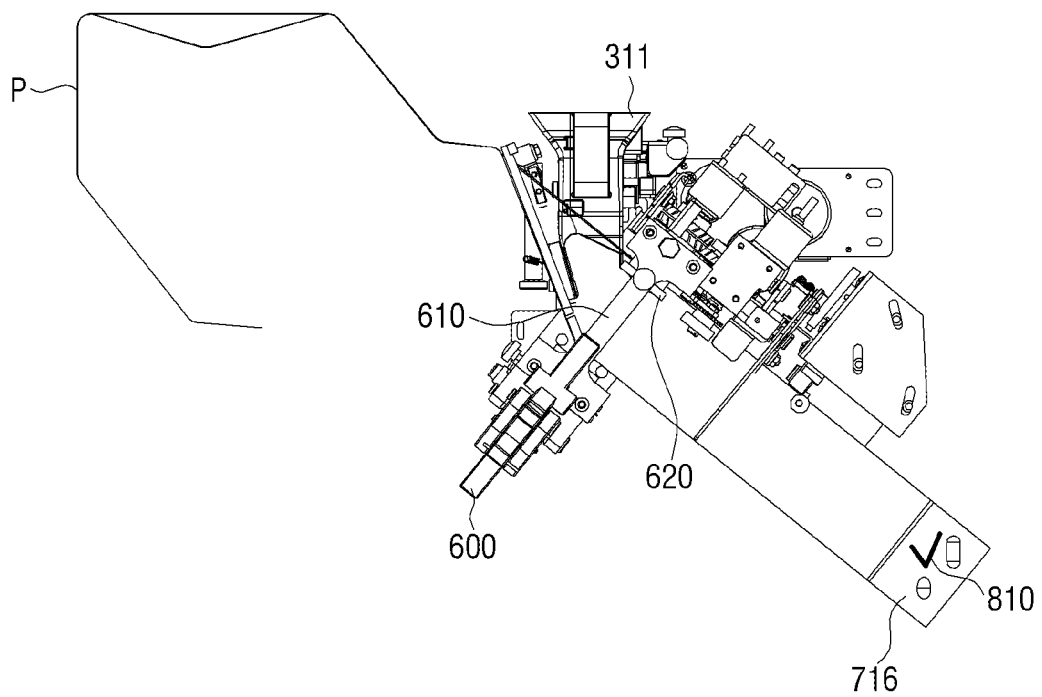
FIG. 26 is a view showing marking displayed on a medicine sheet determined that the medicine is insufficient.
Figure 27:
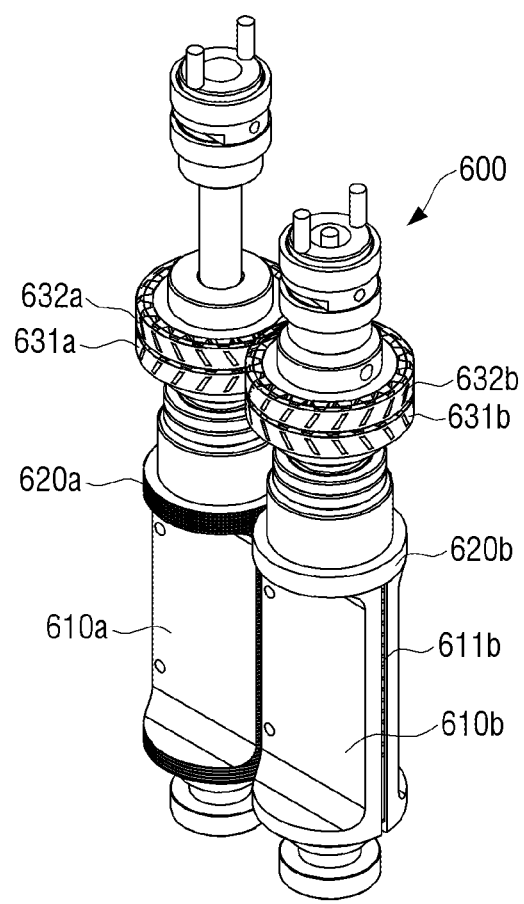
FIGS. 27 and 28 are views showing a rotating state of a heater roller of the sealing apparatus.
Figure 28:
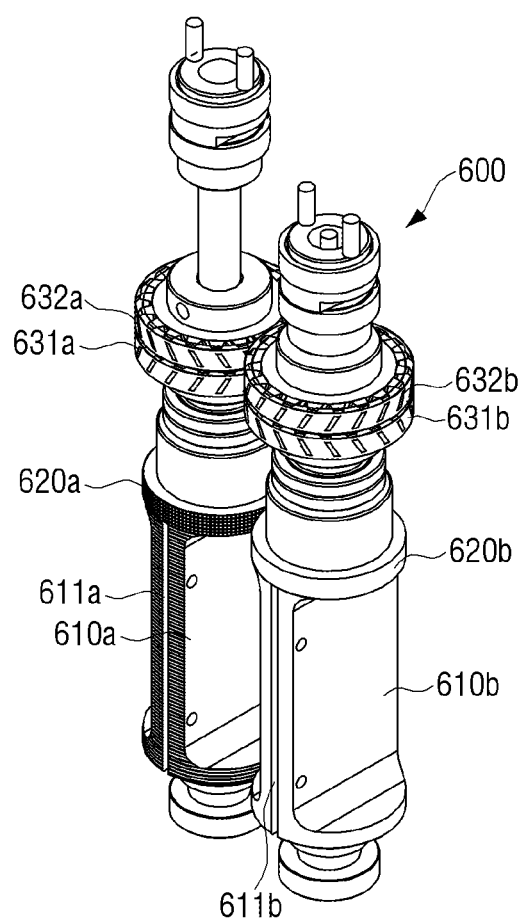

FIG. 24 is a front view showing a sealing apparatus, FIG. 25 is a view showing a medicine sheet whose length is variable, FIG. 26 is a view showing an indication on a medicine sheet determined that the medicine is insufficient, and FIGS. 27 and 28 are views showing a rotating state of a heater roller of the sealing apparatus.

Referring to FIG. 24, the medicine is transferred to an auxiliary hopper 311 through the discharge part 310 of the rotation hopper. The medicine sheet P is folded in half by the guide member 630 disposed in front of the sealer 600 to form a space capable of receiving the medicines. The auxiliary hopper 311 guides the medicines to the receiving space A of the medicine sheet P folded in half.

The medicine sheet P is horizontally sealed by rotating a lateral heater roller 610, and longitudinally sealed by rotating a longitudinal heater roller 620. By doing so, the medicine sheet (P) packages a medicine corresponding to one pack in which medicines are stored.

Referring to FIG. 25, the width of the medicine sheet is varied depending on the medicine quantity and thus the medicines are packaged. A first package 711 of the firstly packaged medicine sheet is loaded with three medicines and has an appropriate width for packaging. Thereafter, a second package 712 is loaded with five medicines and has a width wider than that of the first package 711 for packaging. Third and fifth packages 713 and 715 are loaded with three medicines, respectively, and a fourth package 714 is loaded with five medicines. The third to fifth packages 713, 714 and 715 have corresponding widths for packaging.

The width of the package of the medicine sheet 510 is determined by the quantity of the medicine detected by the inspector 400. The medicine quantity may be detected to calculate the total volume of medicines. Further, the volume of medicines may be input to a server or a data repository in advance or the total volume of medicines may be calculated based on the input information and the volume of the medicines may be calculated based on the distributed area of the medicines.

In addition, the width of the medicine package in proportion to the volume of the medicine may be set by calculating the volume of the medicine but the controller may also select the width of the medicine package corresponding to the width that corresponds to the volume of the medicine among the plurality of predetermined widths of the medicine package.

It is assumed that the width of the medicine is set to be selectable as four widths of 35 mm, 50 mm, 65 mm, and 80 mm.

If the controller selects the medicine package based on the quantity, the width is set to be 35 mm when there are one to three medicines, the width is set to be 50 mm when there are 4 to 6 medicines, the width is set to be 65 mm when there are 6 to 10 medicines, and the width is set to be 80 mm when there are 10 medicines, and thus the number is extracted from the image photographed by the inspector 400 and the width of the medicine package belonging to the corresponding number range may be selected.

When the controller selects the width by calculating the volume based on the photographed image, for example, if the volume of the medicine is 2 to 4 $cm^3$, the width is set to be 35 mm, if the volume of the medicine is 4 to 7 $cm^3$, the width is set to be 50 mm, if the volume of the medicine is 7 to 10 $cm^3$, the width is set to be 65 mm, and if the volume of the medicine is 10 $cm^3$, the width is set to be 80 mm, and thus the number is extracted from the image photographed by the image input device 153 and based on the extracted number, the width of the medicine package may be selected.

As described above, the controller controls the sealer 600 based on the volume calculated as described above to control the packaging width of the medicine sheet P.

Referring to FIG. 26, a sixth package 716 is marked by a "V" shape 810. For example, the sixth package 716 should have included three medicines, two medicines are included. If the controller determines that the medicine is insufficient based on the photographed image of the image input device provided in the inspector 400, the marker (not shown) provided in the rear sheet movement path of the sealer may perform the marking on the packaged medicine sheet. The medicine package 516 marked by the "V" shape 530 is separately inspected by a pharmacist and is discarded if the medicine is insufficient or excessive. If the inspector 160 is erroneously determined whether the medicine is insufficient or excessive, the "V" shape 530 is deleted and the medicine package 516 may be used as it is. To this end, the marker may be a water pen or the like which may perform the erasable marking.

Referring to FIG. 27, the roller of the sealer includes a pair of lateral sealing rollers 610a and 610b and a pair of longitudinal sealing rollers 620a and 620b. The pair of lateral sealing rollers 610a and 610b and the pair of longitudinal sealing rollers 620a and 620b are driven separately so that the pair of lateral sealing gears 631a and 631b rotate to transfer power to the pair of lateral sealing rollers 610a and 610b.

The pair of longitudinal sealing gears 632a and 632b rotate to transfer power to the pair of longitudinal sealing rollers 620a and 620b. If the medicine sheet P is fed between the sealer, the pair of lateral sealing rollers 610a and 610b face each other at a location as shown in FIG. 8 to apply heat and a pressure, thereby sealing the medicine sheet. The interval between the portions sealed by the lateral sealing rollers 610a and 610b becomes the width of the medicine sheet P.

The longitudinal sealing rollers 620a and 620b rotate to seal the open surface of the medicine sheet P folded in half.

If the longitudinal sealing rollers 620a and 620b and the lateral sealing rollers 610a and 610b rotate at the same speed, the width of the medicine sheet is determined to be the outer circumference of the longitudinal sealing rollers 620a and 620b. The lateral sealing rollers 610a and 610b may stop while the longitudinal sealing rollers 620a and 620b rotate or the width of the medicine sheet may be changed by controlling the rotational speed of the lateral sealing rollers 610a and 610b.

Referring to FIG. 28, the surfaces on which the heater of the lateral sealing rollers 610a and 610b is not present face each other. In this case, if only the longitudinal sealing rollers 620a and 620b rotate, their widths become wider.

Contact surfaces 611a and 611b of the lateral sealing rollers 610a and 610b may transfer heat to the medicine sheet and may include a cutter (not shown) capable of forming a perforated line.

As shown in FIG. 28, the longitudinal seal rollers 620a and 620b rotate by a predetermined width and the lateral sealing rollers 610a and 610b simultaneously rotate to be disposed as shown in FIG. 27, thereby sealing the medicine sheet by the predetermined width.

A heater of a material having good conductivity is attached to all of the bonding surfaces of the lateral sealing rollers 610a and 610b and the lateral sealing may be made every time the lateral sealing rollers 610a and 610b rotate by 180°.

In the state where the surfaces on which the heaters are not present face each other as shown in FIG. 28, in the longitudinal sealing rollers 620a and 620b and the lateral sealing rollers 610a and 610b, the longitudinal sealing rollers 620a and 620b are driven first. The longitudinal sealing rollers 620a and 620b longitudinally seal the medicine sheet P by a length corresponding to the predetermined width. Since the lateral sealing rollers 610a and 610b do not rotate still, the lateral sealing rollers 610a and 610b are disposed as shown in FIG. 28.

Next, for the lateral sealing, the lateral sealing rollers 610a and 610b start to rotate simultaneously with the longitudinal sealing rollers 620a and 620b. As shown in FIG. 27, the surfaces on which the heaters are present rotate by being engaged with each other, and the pair of lateral sealing rollers 610a and 610b seals the medicine sheet.

After the medicine sheet is sealed, the lateral sealing rollers 610a and 610b and the longitudinal sealing rollers 620a and 620b rotate so as to be disposed as shown in FIG. 28. If there is a workload, the above process is repeated.

Hereinafter, a medicine packing method using a medicine packing apparatus according to an exemplary embodiment of the present disclosure will be described with reference to the accompanying drawings.

Figure 29:
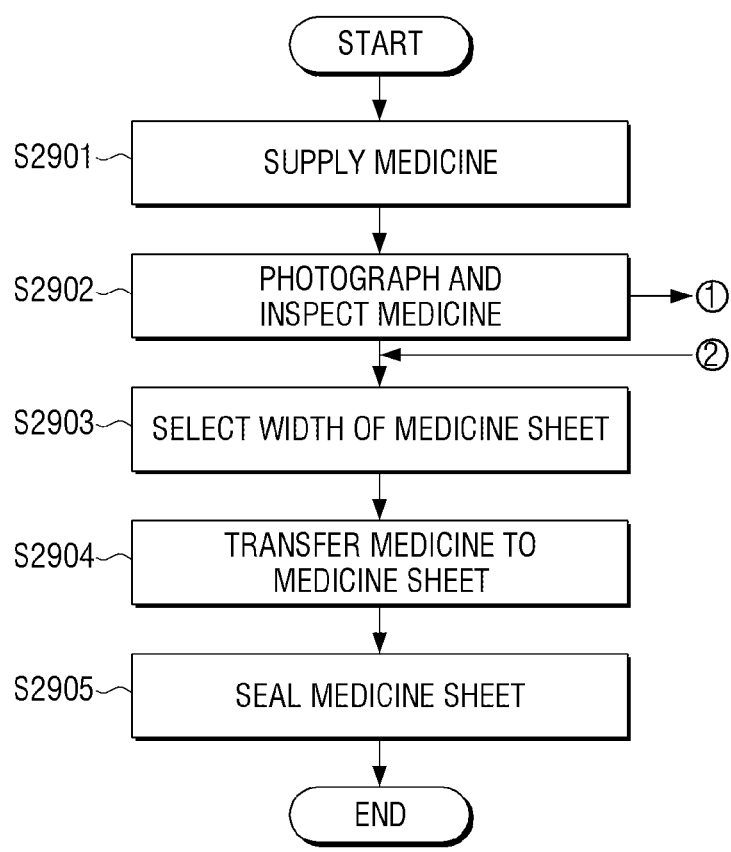
FIG. 29 is a flowchart showing a medicine packaging process.
Figure 30:
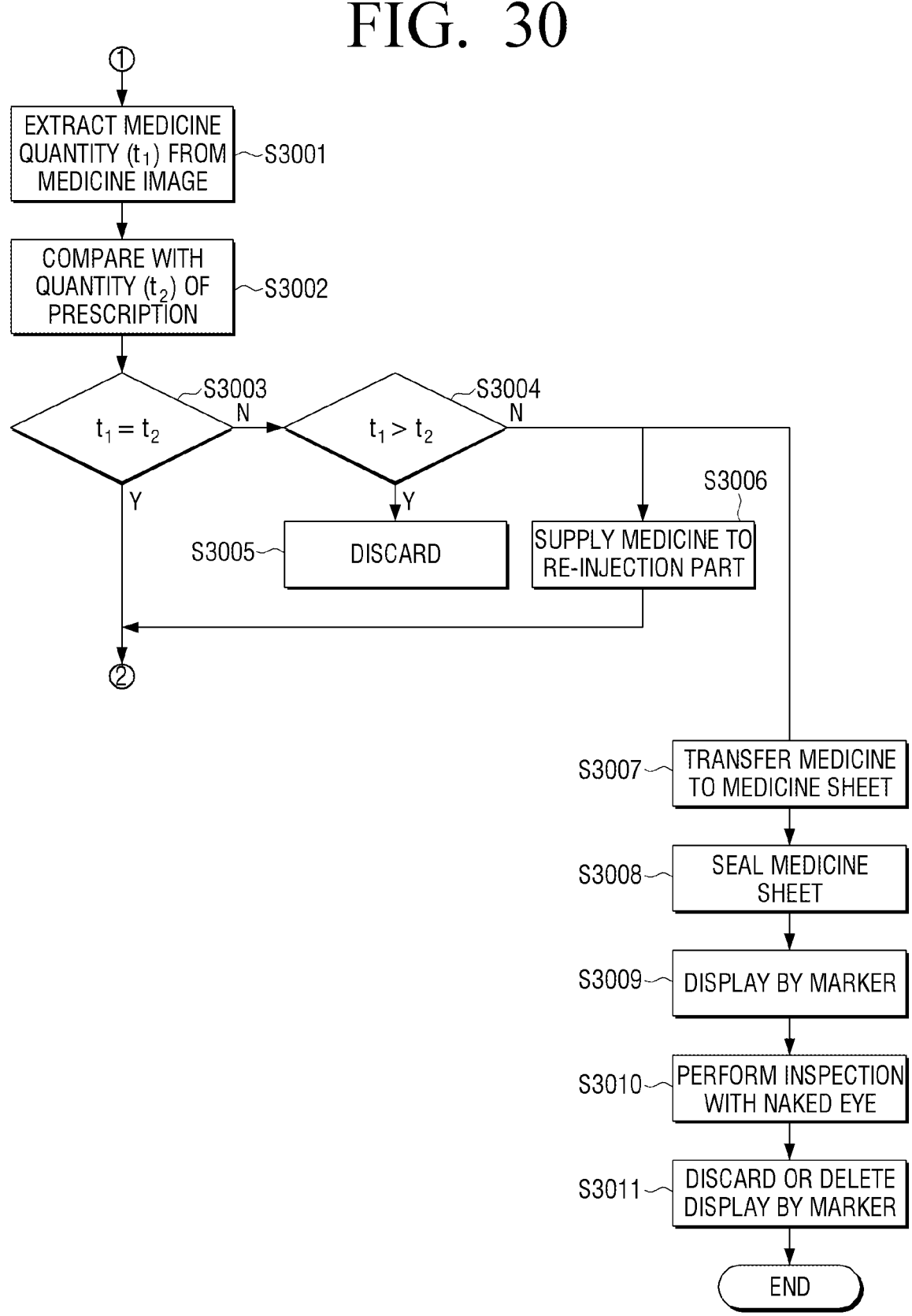
FIG. 30 is a flowchart showing a photographing and inspection process of the medicine of FIG. 29.
Figure 31:
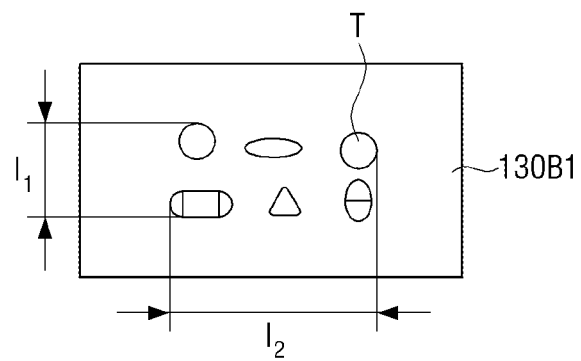
FIG. 31 is a schematic view showing a disposition of medicines to explain a process of calculating a width of a package based on the number of medicines.

FIG. 29 is a flowchart showing a medicine packaging process, FIG. 30 is a flowchart showing a photographing and inspection process of the medicine of FIG. 29, and FIG. 31 is a schematic view showing an arrangement of medicines to explain a process of calculating a width of a package based on the number and shape of medicines.

The medicine is transferred from the medicine dispenser 10 to the partition space corresponding to the injection parts 210A and 210B among the plurality of partition spaces formed in the rotation hopper 30 (S2901). In this step, the medicine is transferred from the tablet cassette 3 to the injection part 210B through the main hopper and supplied to the rotation hopper 30.

The medicines supplied to the rotation hopper 30 are photographed by the image input device of the inspector 400, and it is checked whether the medicines are transferred like the prescription based on the photographed image (S2902). Although the photographing and the inspection of the medicine are shown as being performed in the corresponding partition space of the second injection part 210, the present disclosure is not limited thereto, and the medicines may be photographed and inspected in any partition space before being transferred to the discharge part 310.

Based on the photographed images of the medicines, the quantity, shape, area information and the like are obtained, and the volume of the medicine is calculated based on the information. Based on the calculated volume, the width of the medicine sheet is set or an appropriate width among a plurality of predetermined widths is selected (S2903). If the image of the medicine is unclear, the inspector may again acquire the medicine image by the re-photographing.

Based on the set or selected width, the prescription information display device 900 prints the medicine information in the predetermined area of the medicine sheet, and the guide roller 720 transfers the printed medicine sheet to the sealing apparatus.

Next, if a cell including the medicine transferred by the transfer member 110 moves to be transferred to a discharge region D, the medicine is transferred to the medicine sheet through the auxiliary hopper 311 (S1004). Thereafter, the sealer 600 controls the rotational speed of the lateral sealing rollers 610a and 610b and the longitudinal sealing rollers 620a and 620b at the selected width of the medicine sheet P or controls the width by the method for rotating only the longitudinal sealing roller to perform the sealing (S2905).

FIG. 30 shows a process of inspecting a medicine from the photographed medicine image in the photographing and inspection step of the medicine.

A medicine quantity t1 is extracted from the medicine image (S3001), and compared with a medicine quantity t2 of the prescription (S3002).

If the medicine quantity t2 of the prescription is equal to the medicine quantity t1 extracted from the image (S3003), the process of selecting the width of the medicine sheet is performed (S2903) to transfer the medicine to the medicine sheet and package the medicine.

However, if there is an error in the transferred medicine, it is determined whether the medicinal quantity t1 extracted from the medicinal image is larger than the medicine quantity t2 of the prescription (S3004). If the medicine quantity t1 extracted from the image is larger than the medicine quantity t2 of the prescription, the medicine is directly transferred to the disposal part 320 to discard the stored medicine (S3005).

If the medicine quantity t1 extracted from the image is smaller than the medicine quantity t2 of the prescription, the cell including the medicine is transferred to the re-injection area D. Thereafter, a pharmacist determines the medicine that is insufficient based on the image, and manually injects the medicine into the re-injection tray 221 (S3006). Although the case where a pharmacist injects a medicine manually is described, if it is determined that the medicine is insufficient based on the image photographed by the inspector, the controller may transfer the medicine in the tablet cassette 3 to the re-injection part 220 to transfer the medicine.

Even when the medicine quantity t1 is smaller than the medicine quantity t2 of the prescription, the controller may transfer the medicine to the discharge part 310 through the rotation member 110 to transfer the medicine to the medicine sheet P (S3007). Thereafter, the medicine sheet is sealed by the sealer 600 (S3008), and the medicine sheet P in which the corresponding medicine is packaged may be marked by the marker disposed in the path passing through the sealer 600 (S3009).

Thereafter, a pharmacist inspects whether the medicine in the marked sheet is the same medicine as the prescription (S3010). Thereafter, if the medicine matches the prescription, the display by the marker is deleted and if the medicine mismatches the prescription, the medicine is discarded (S3011).

Referring to FIG. 31, a plurality of medicines T are supplied to the fifth linear partition space 130B1. The processor compares the medicine data stored in the server or the repository on the basis of the shape of each medicine (T) photographed to determine the kind of medicines. The entire volume of the medicine is determined based on the volume of the medicine T according to each type of medicines T and the width of the medicine sheet P may be selected from the predetermined widths or may be determined to be proportional to the entire volume of the medicine based.

In addition, the width may be roughly selected based on the number of photographed medicines.

As another method, a width and a length l1 and l2 may be calculated based on the photographed image, the volume may be calculated based thereon, and the width at which the medicine may be packaged may be selected.

For example, the area of the medicine may be obtained by the product of the width l1 and the height l2 of the medicine of the photographed image and the volume of the medicine may be roughly set by multiplying it by a predetermined height of the medicine. The processor may determine the width of the medicine sheet P based on the calculated volume and instruct the medicine to be sealed based on the determined width of the medicine sheet P or the determined width of the medicine sheet P within the corresponding range.

The exemplary embodiments of the present disclosure disclosed in the present specification and the accompanying drawings have been provided only as specific examples in order to assist in understanding the present disclosure and do not limit the scope of the present disclosure. It is obvious to those skilled in the art to which the present disclosure pertains that various modifications may be made without departing from the scope of the present disclosure, in addition to the exemplary embodiments disclosed herein.

What is claimed is:

1. A medicine packing apparatus, comprising: a rotation hopper provided with a plurality of partition spaces, receiving a medicine from a medicine dispenser at any one of the plurality of partition spaces through at least one injection part, and transferring the medicine;
    an inspector photographing the transferred medicine to inspect the medicine;
    a controller determining whether the medicine inspected by the inspector matches a medicine of a prescription;
    a discharge part discharging the injected medicines that match the prescription of the inspection result;
    a disposal part configured to open and dispose injected medicines that do not match the prescription of the inspection result;
    a re-injection part that re-injects medicines so that the medicines match a list of medicines if the controller determines that the inspected medicines do not match the list of medicines; a cassette for dispensing typical medicines;
    a tablet tray for dispensing atypical medicines; and
    an external inlet disposed at an outside of the medicine packing apparatus, the external inlet guiding a medicine to be injected to the re-injection part in replacement of the medicines omitted,
    wherein the rotation hopper includes:
    a bottom portion on which the medicine collected from a medicine dispenser is placed; and
    a medicine transfer part transferring a medicine, wherein the bottom portion is unmovably fixed, and the medicine transfer part moves on the fixed bottom portion while pushing a medicine placed at one location to another location of the bottom portion,
    wherein the medicine transfer part includes:
    a rotation member rotatable by a driver,
    a partition member connected to the rotation member to form the plurality of partition spaces, and
    a pair of linear portions facing each other and a pair of curved portions facing each other, the pair of curved portions connecting both ends of the pair of linear portions on a plane,
    wherein the partition member includes a lower portion for contacting the medicine and an end portion for contacting the medicine, formed of a flexible material,
    wherein the inspector is disposed in a partition space in which the injection part of a last medicine among the medicines in the list of medicines is disposed, the disposal part is disposed in the partition spaces in which the rotating direction of the partition space in the inspector is disposed, the re-injection part is disposed in the partition spaces in the rotating direction of the partition space in which the disposal part is disposed, and the discharge part is disposed in the partition spaces in the rotating direction of the partition space in which the re-injection part is disposed, and
    wherein the injection part comprises a first injection part injecting the medicines collected from the tablet tray and a second injection part injecting the medicines collected from the cassette.

2. A medicine dispensing apparatus, comprising:
    a cassette for dispensing typical medicines;
    a tablet tray for dispensing atypical medicines;
    an external inlet disposed at an outside of the medicine dispensing apparatus;
    a rotation hopper including a rotation member;
    a plurality of partition spaces transferred by the rotation member;
    an injection part injecting medicines into at least one of the partition spaces;
    an inspector inspecting injected medicines, disposed in the partition space in which all medicines in a list of medicines described in a prescription are collected;
    a discharge part discharging the injected medicines that match the prescription of the inspection result;
    a disposal part configured to open and dispose injected medicines that do not match the prescription of the inspection result;
    a controller determining whether the medicines inspected by the inspector match the list of medicines; and
    a re-injection part re-injecting medicines so that the medicines match the list of medicines if the controller determines that the inspected medicines do not match the list of medicines,
    wherein the inspector is disposed in a partition space in which the injection part of a last medicine among the medicines in the list of medicines is disposed,
    the disposal part is disposed in the partition spaces in the rotating direction of the partition space in the inspector is disposed,
    the re-injection part is disposed in the partition spaces in the rotating direction of the partition space in which the disposal part is disposed,
    the discharge part is disposed in the partition spaces in the rotating direction of the partition space in the re-injection part is disposed,
    wherein the injection part comprises a first injection part injecting the medicines collected from the tablet tray and a second injection part injecting the medicines collected from the cassette, and
    wherein the re-injection part is supplied the medicines through the external inlet.

3. The medicine dispensing apparatus as claimed in claim 2, wherein the plurality of partition spaces are formed by a plurality of partition members of which one end is fixed to the rotation member.

4. The medicine dispensing apparatus as claimed in claim 2, wherein the medicine rotation hopper comprises a pair of curved portions facing each other connecting both ends of a pair of straight portions and a pair of straight portions facing each other on a plane.

5. The medicine dispensing apparatus as claimed in claim 2, further comprising: a medicine dispenser comprising at least one of a tablet receiving part, the tablet receiving part including an atypical tablet receiving part, a powder receiving part, and a special handling medicine receiving part.

6. The medicine dispensing apparatus as claimed in claim 2, wherein the first injection part and the second injection part are disposed in the same partition space.

7. The medicine dispensing apparatus as claimed in claim 2, wherein the controller, based on determining whether the medicines inspected by the inspector match the medicines described in the prescription, controls the disposal part to be open to empty the partition space.

8. The medicine dispensing apparatus as claimed in claim 2, wherein the controller, based on the inspection information being at least one of over-injection of medicines, mismatched medicines, or breakage of medicines, controls the disposal part to be open to empty the partition space.

* * * * *